United States Patent
Ichinose et al.

(10) Patent No.: US 8,097,971 B2
(45) Date of Patent: Jan. 17, 2012

(54) WIND TURBINE GENERATOR SYSTEM

(75) Inventors: Masaya Ichinose, Hitachiota (JP);
Motoo Futami, Hitachiota (JP);
Hiromitsu Sakai, Tokai (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 12/453,312

(22) Filed: May 6, 2009

(65) Prior Publication Data

US 2009/0278354 A1    Nov. 12, 2009

(30) Foreign Application Priority Data

May 9, 2008    (JP) .................................. 2008-122844

(51) Int. Cl.
*H02J 3/00*    (2006.01)
*H02P 9/00*    (2006.01)
(52) U.S. Cl. ............................. 290/44; 307/153; 322/44
(58) Field of Classification Search ................... 290/44; 307/153; 322/44
See application file for complete search history.

(56) References Cited

U.S. PATENT DOCUMENTS

| | | | |
|---|---|---|---|
| 7,321,221 B2 * | 1/2008 | Bucker et al. .................... | 322/44 |
| 7,652,387 B2 * | 1/2010 | Corcelles Pereira et al. ... | 290/44 |
| 7,692,325 B2 * | 4/2010 | Ichinose et al. ................. | 290/44 |

FOREIGN PATENT DOCUMENTS

| | | |
|---|---|---|
| JP | 05-284794 | 10/1993 |
| JP | 07-194196 | 7/1995 |
| JP | 2006-230085 | 2/2005 |
| JP | 2007-244136 | 3/2006 |
| JP | 2006-230085 | 8/2006 |
| JP | 2008-283747 | 5/2007 |
| JP | 2008-301584 | 5/2007 |
| JP | 2008-306776 | 6/2007 |

* cited by examiner

*Primary Examiner* — Burton Mullins
(74) *Attorney, Agent, or Firm* — Stites & Harbison PLLC; Juan Carlos A. Marquez, Esq.

(57) ABSTRACT

In a wind turbine generator system including an AC exciting converter a grid side converter, and a controller configured to control the AC-exciting converter and the grid side converter, the controller operates a short-circuiting circuit when decrease in the grid voltage and increase in the DC voltage are detected.

16 Claims, 23 Drawing Sheets

WIND TURBINE GENERATOR SYSTEM

CROSS REFERENCE TO RELATED APPLICATIONS

This application claims the foreign priority benefit under Title 35, United States Code, §119(a)-(d) of Japanese Patent Application No. 2008-122844, filed on May 9, 2008 in the Japan Patent Office, the disclosure of which is herein incorporated by reference in its entirety.

BACKGROUND OF THE INVENTION

1. Field of the Invention

The present invention relates to a wind turbine generator system and particularly to a wind turbine generator system capable of protecting a converter connected to a rotor of an AC-excited generator from a voltage drop due to a power failure in a grid.

2. Description of the Related Art

An AC-excited generator (Doubly-Fed Induction Machine) in a power generating system can equalize in frequency a generated voltage at a stator to a grid by AC-exciting a rotor at a slip frequency (difference between the grid frequency and a rotational frequency). The variable exciting frequency of the rotor (slip frequency) allows a revolution speed of the wind turbine to be variable as well as an exciting converter for the rotor to be smaller in capacity than other type of electric generators.

However, when a voltage drop in a grid occurs due to an earth fault, the AC-excited generator tends to supply a power to the place where the earth fault occurs. In the event, an excessive current is induced in rotor windings, which causes an excessive current in an exciting converter connected to the rotor. Accordingly, a device, called Crow-bar, for short-circuiting a rotor circuit with thyristors may be used.

In Europe and other countries there are regulations which require that wind turbine systems continue to operate without disconnection from the grid. Thus, when a short-time voltage drop occurs, the wind turbine generator systems are required to restart power generation after power failure without disconnection from the grid to minimize influence on the grid.

Conventionally, the AC-excited generators are mainly used in large-scale power generation systems such as pumped storage power plants. An operating method of the AC-excited generators is known in which, upon a large scale power failure in the grid, a rotor circuit is short-circuited with externally excited devices.

SUMMARY OF THE INVENTION

An aspect of the present invention provides a wind turbine generator system comprising: an AC-excited generator, including a stator to be connected to a grid and a rotor coupled to a turbine for rotating the rotor, configured to supply a power to the grid; a converter unit including: an AC exciting converter, including a first DC part, configured to perform power conversion to AC-excite the rotor; and a grid side converter, connected to the stator and to be connected to the grid, including a second DC part connected to the first DC part, configured to perform power conversion to control a DC voltage; a short-circuiting circuit, including an AC input connected a point between the rotor and the AC exciting converter, a switching device, and a resistor which is disconnected and connected by the switching device, configured to short-circuit; and a controller, supplied with a backup power, configured to control the AC-exciting converter and the grid side converter, the controller including a first detector for detecting a grid voltage and a second detector for detecting the DC voltage. The controller operates the short-circuiting circuit when decrease in the grid voltage and increase in the DC voltage are detected.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

The present invention provides a wind turbine generator system capable of continuously operating without disconnecting the generator from the grid by protecting a converter for exciting rotor windings in the AC-excited generator from the excessive current generated by a power system failure or a power system disturbance. Particularly, when a power generation quantity is low, there may be a trouble where the power converter cannot be operated because a DC voltage in the converter increases before a current in the rotor reaches an excessive current level. The present invention provides an AC-excited generator capable of preventing the excessive DC current in the converter to avoid such the trouble to restart the generating operation immediately after restoration of the power system failure.

Further the present invention provides a wind turbine generator system including an excessive current consuming unit (a short-circuiting circuit) having an AC input connected to a point between the rotor and the AC exciting converter. The excessive current consuming unit is operated when decrease in a grid voltage and increase in a DC voltage in the exciting converter are detected.

The wind turbine generator system can absorb an excessive current generated in the rotor in the AC excited generator to surely protect the converter connected to the rotor.

In other words, to protect the AC exciting converter for the AC-excited power generator from an excessive current due to a power system disturbance and provide a continuous operation, an AC input of a power system failure response circuit (excessive current consuming circuit) is connected to a point between the rotor of the generator and an exciting converter. The power system failure response circuit is operated upon a power system failure by detecting decrease in the grid voltage and increase in the DC voltage in the exciting converter.

First Embodiment

Figure 1:
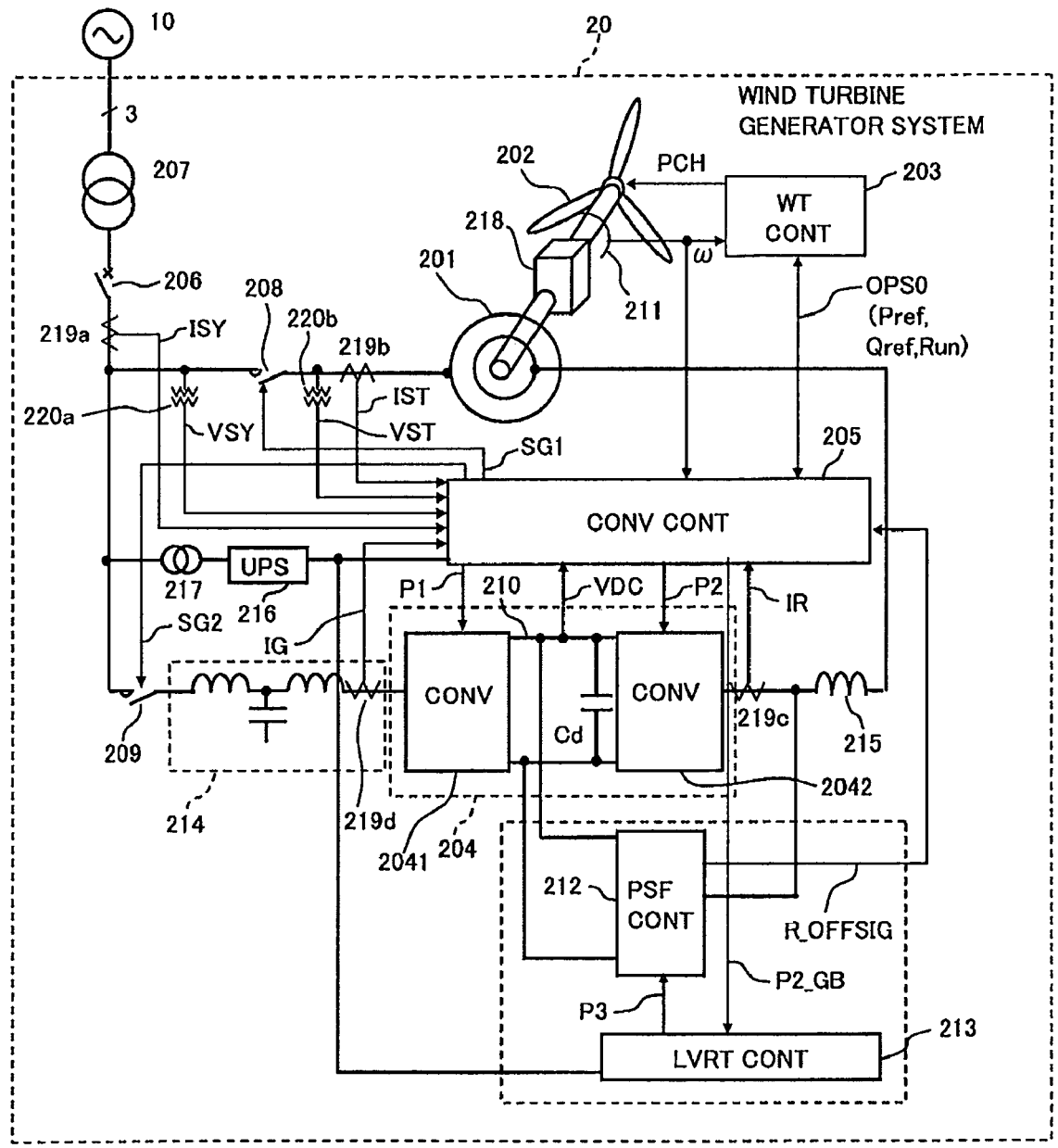
FIG. 1 is a block diagram of a wind turbine generator system according to a first embodiment of the present invention.

With reference to FIG. 1 (single wire circuit diagram) will be described a first embodiment of a wind turbine generator system according to the present invention.

A wind turbine generator 20 is connected to a grid 10 through transmission lines. The wind turbine generator system 20 mainly includes an AC-excited generator (doubly-fed induction machine) 201, blades 202, a wind turbine controller 203, a converter unit 204, a converter controller 205, a power system failure response circuit 212, and a power system failure response circuit controller (LVRT CONT) 213.

The blades 202 are mechanically coupled to the rotor of the generator 201 through gears 218.

Rotor windings of the generator 201 are electrically connected to the converter unit 204. A stator of the generator 201 is electrically connected to the gird 10 through a breaker 206 and a transformer 207, etc.

The wind turbine controller 203 calculates operation command signals OPS0 such as detecting a wind speed and calculating an angle control of the blades 202, generating a power generation command Pref, outputting a run/stop command Run indicating running and stopping, and generating a reactive power command Qref.

The operation command signals OPS0 such as the reactive power command Qref, the power generation command Pref, the run/stop command Run, and a blade angle command are sent to the converter controller 205 and a blade angle changing device in the turbine controller 203.

The converter controller 205 adjusts an output voltage of the converter unit 204 in accordance with a command to control a power (generated power and reactive power) between the generator 201 and the grid 10.

Next will be described the converter unit (exciting circuit) 204, the converter controller 205, the power system failure response circuit 212, and the power system failure response circuit controller 213. Three-phase outputs on the stator side of the generator 201 are coupled to the grid 10 through a grid coupling transformer 207. The three-phase outputs are connected to the grid 10 through a breaker 208, a breaker 206, which are able to open and close in response to a switch-on signal SG1, and through the grid coupling transformer 207 and the like. Further lines from the beaker 206 on the side of the breaker 208 are connected to a filter circuit 214 and a grid side converter 2041 through another breaker 209.

Figure 2:
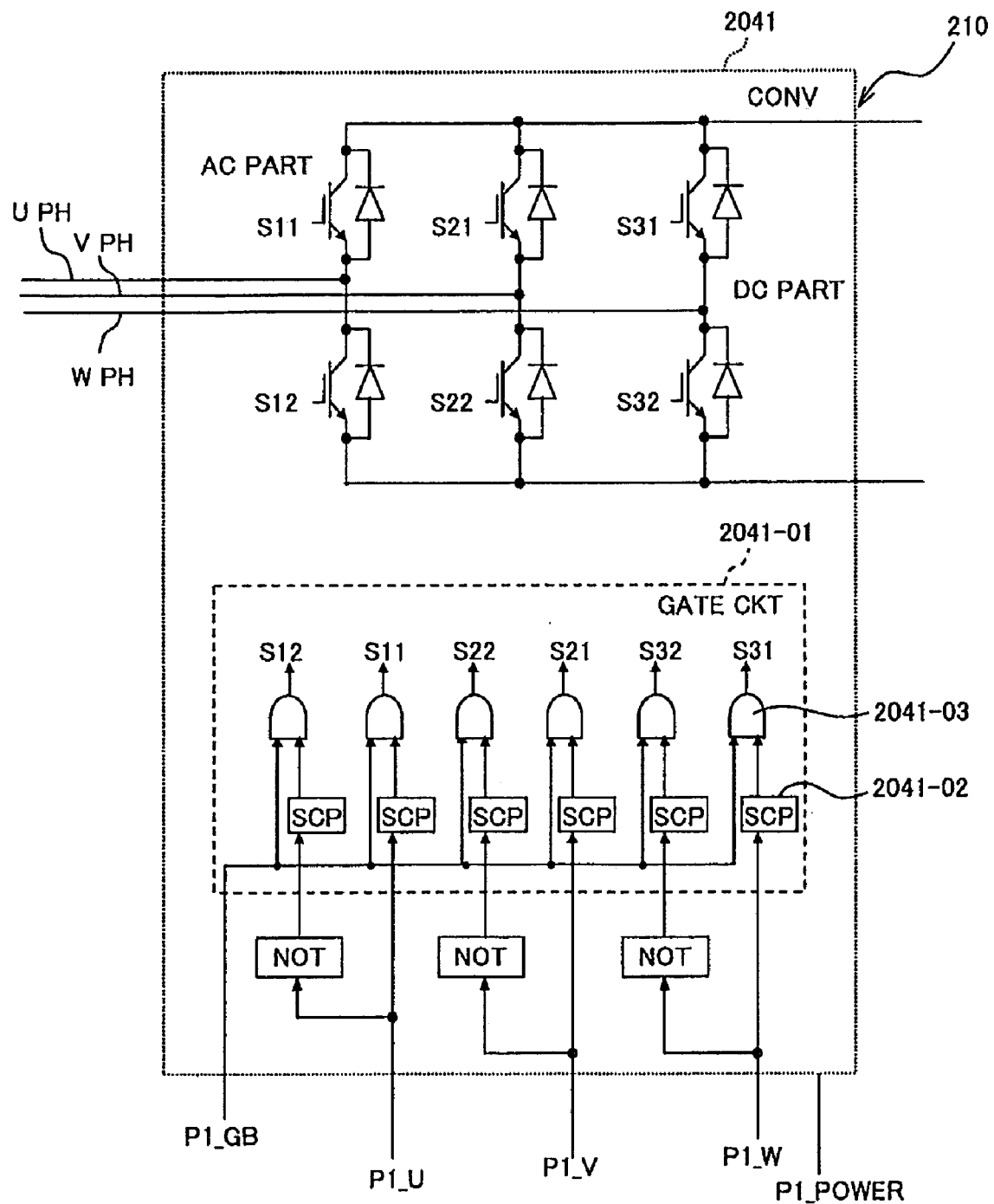
FIG. 2 is a schematic circuit diagram of a grid side converter shown in FIG. 1.

In FIG. 2, the grid side converter 2041 includes a DC circuit 210 together with a generator side converter (AC-exciting converter) 2042. In other words, the DC circuit 210 is formed with a DC circuit in the grid side converter 2041 and a DC circuit in the generator side converter 2041 which are connected. An output of the generator side converter 2042 is connected to the rotor windings of the generator 201 through a reactor 215 for dV/dt control.

Further, lines from the reactor 215 on the side of the generator side converter 2042 are connected to AC input terminals of the power system failure response circuit 212 of which DC output terminals are connected to the DC circuit 210 in the grid side converter 2041 and the generator side converter 2042.

Further, the converter controller 205 is connected to an uninterruptible power supply 216 for backup to supply power from the uninterruptible power supply 216 to the converter controller 205 when the grid voltage decreases. Further, the power system failure response circuit controller 213 is also supplied with the backup power from the uninterruptible power supply 216. Thus, when the grid voltage decreases, the power system failure response circuit controller 213 is also supplied with the backup power from the uninterruptible power supply 216.

The breaker 206 has functions, for example, for cutting off currents by making the circuit open when an excessive current continuously flows and is used to completely stop the wind turbine generator system 20 to electrically disconnect the wind turbine generator system 20 from the grid 10.

The generator side converter 2042 and the grid side converter 2041 comprise, for example, semiconductor switching devices (thyristor, GTO, IGBT, MOS, SiC, and the like) having functions for converting AC into DC or DC into AC.

Further, the AC filter circuit 214, comprising reactors and a capacitor, for attenuating harmonic currents and harmonic voltages is provided at an AC output of the grid side converter 2041.

A rotating part of the generator 201 is connected to blades 202 for wind power generation through the gears 218, and thus rotates upon receiving a wind force. Further, the rotating part is connected to the position detector 211 such as a rotary encoder to output a revolution speed signal ω. The revolution speed signal ω is supplied to the wind turbine controller 203 and the converter controller 205.

Next, will be described wiring and circuits for controlling power generation. Three phase voltages and currents on a secondary side of the breaker 206 are converted in magnitude into a voltage detection signal VSY having a relative low voltage and a current detection signal having a relative low voltage with a voltage sensor 220a and a current sensor 219a, respectively, and supplied to the converter controller 205.

Further, a voltage and a current at the secondary side of the breaker 208 is converted in magnitude with a voltage sensor 220b into a stator voltage VST having a relative low voltage and a current detection signal IST having a relative low voltage with a current sensor 219b, respectively, and supplied to the converter controller 205.

A capacitor Cd connected to the DC circuit 210 formed with a DC part of the grid side converter 2041 and a DC part of the generator side converter 2042 is converted with a voltage sensor into a DC voltage signal VDC having a low voltage which is supplied to the converter controller 205.

An output current IR of the generator side converter 2042 is detected by a current sensor 219c, and an output current IG of the grid side converter 2041 is detected by a current sensor 219d which are input into the converter controller 205.

The wind turbine controller 203 has a function for sending to the converter controller 205 the commands OPS0 such as a run/stop command Run, a power generation command Pref, a reactive power command Qref and a communication function for communicating with the external after detecting conditional quantities of the wind turbine and the wind turbine generator system 20.

The converter controller 205 controls the breakers (electromagnetic contactors) 208 and 209 with switch-on signals SG1 and SG2, respectively, and outputs pulse signals (gate signals) P1 and P2 for controlling the grid side converter 2041 and the generator side converter 2042 which are formed with semiconductor switching elements.

The converter controller 205 is connected to the uninterruptive power supply 216 to operate even if the grid voltage decreases. The uninterruptive power supply 216 receives an AC voltage adjusted by the transformer 217. When an input voltage of the uninterruptive power supply 216 is normal, the grid voltage is supplied to the converter controller 205, but when the grid voltage is abnormal, power is supplied to the converter controller 205 from energy storing devices such as batteries in the uninterruptive power supply 216.

The power system failure response circuit controller 213 connected to the power system failure response circuit 212 sends operation command P3 to the power system failure response circuit 212. Further, the power system failure response circuit controller 213 inputs an inverter input current to detect an excessive current. A detailed description on operation will be described later and is omitted here.

FIG. 2 shows a structure of the grid side converter 2041. The grid side converter 2041 is formed with devices such as semiconductor devices. FIG. 2 shows an example of three-phase converter which is formed with semiconductor devices S11, S12, S21, S22, S31, and S32, in which the semiconductor devices are IGBT and diodes in this embodiment. The semiconductor devices S11 and S12 provide upper and lower arms of U phase, respectively, the semiconductor devices S21 and S22 provide upper and lower arms of V phase, respectively, and semiconductor devices S31 and S32 provides upper and lower arms of W phase, respectively.

Turning on and off the IGBT semiconductor devices generates three-phase AC voltage at AC terminals thereof and adjusting the AC voltage controls the output current IG.

The gate signals P1 (P1_GB, P1_U, P1_V, and P1_W) are supplied from the converter controller 205. The subscript U of the gate signal P1 indicates the signal P1_U for the U phase; the subscript V of the gate signal P1, the signal P1_V for the V phase; and the subscript W of the gate signal P1, the signal P1_W for the W phase. Further, P1_POWER is a gate circuit supply power for turning on and off the semiconductor devices in the converter 2041 and is supplied from a supply power isolated from the converter controller 205. Further a gate block signal P1_GB is for stopping turning-on-and-off operation of the semiconductor devices S11 to S32 responsive to the gate signals (all semiconductor devices S11 to S32 are all turned off) and is supplied from the converter controller 205.

The lower arm device S12 of the U phase is supplied with a gate signal which is obtained by inverting the gate signal for the upper arm device S11 (when S11 is ON, the device S12 is OFF). Similarly, the lower arms of the V and W phases are supplied with inverted signals of the corresponding upper arms. To generate the inverted signals, invertors (NOT) are used. The gate signals S11 to S32 are provided with time intervals called dead time with a short-circuit preventing circuits (SCP) 2041-02 in the gate circuit to prevent the upper and lower arms from short-circuit (avoid both turning ON simultaneously). The short-circuit preventing circuits 2041-02 includes a delay 2041-02a for delaying each of phase signals P1_U, P1_V, and P1_W, and an AND gate 2041-02b responsive to the each phase signal and the delay 2041-02a.

To stop turning on and off of the semiconductor devices, the gate block signal P1_GB is used. The gate block signal P1_GB is supplied to AND gates 2041-03 together with the pulse signals P1. Since the gate block signal P1_GB is set to "0" to stop switching the gate, the semiconductor devices S11 to S32 are all turned off irrespective of the states of the pulse signals P1.

Figure 3:
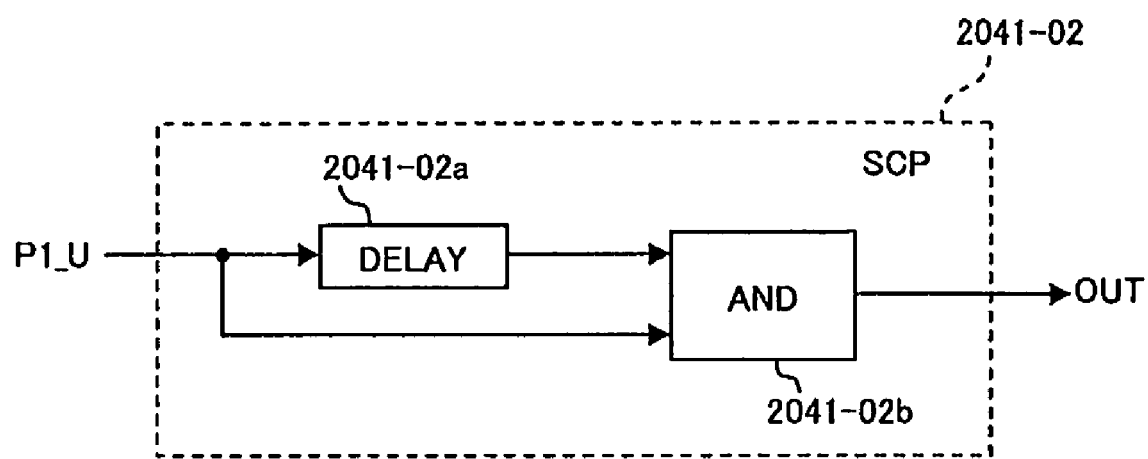
FIG. 3 is a schematic circuit diagram of a short-circuit preventing circuit shown in FIG. 2.

FIG. 3 is a schematic circuit diagram of the short-circuit preventing circuit 2041-02. The input pulse is delayed by the short-circuit preventing interval with a delay (DELAY). The delayed signal and the input original signal are supplied to an AND gate (AND) to be subject an AND logical operation. In an output signal (OUT), a signal ON timing is delayed by Td. Accordingly, for example, the upper switching device is turned off, the lower switching device is turned on with delay Td (after time interval Td from OFF of the upper switching device). This prevents both upper and lower switching devices from simultaneously turning ON to prevent DC short-circuit.

Figure 4:
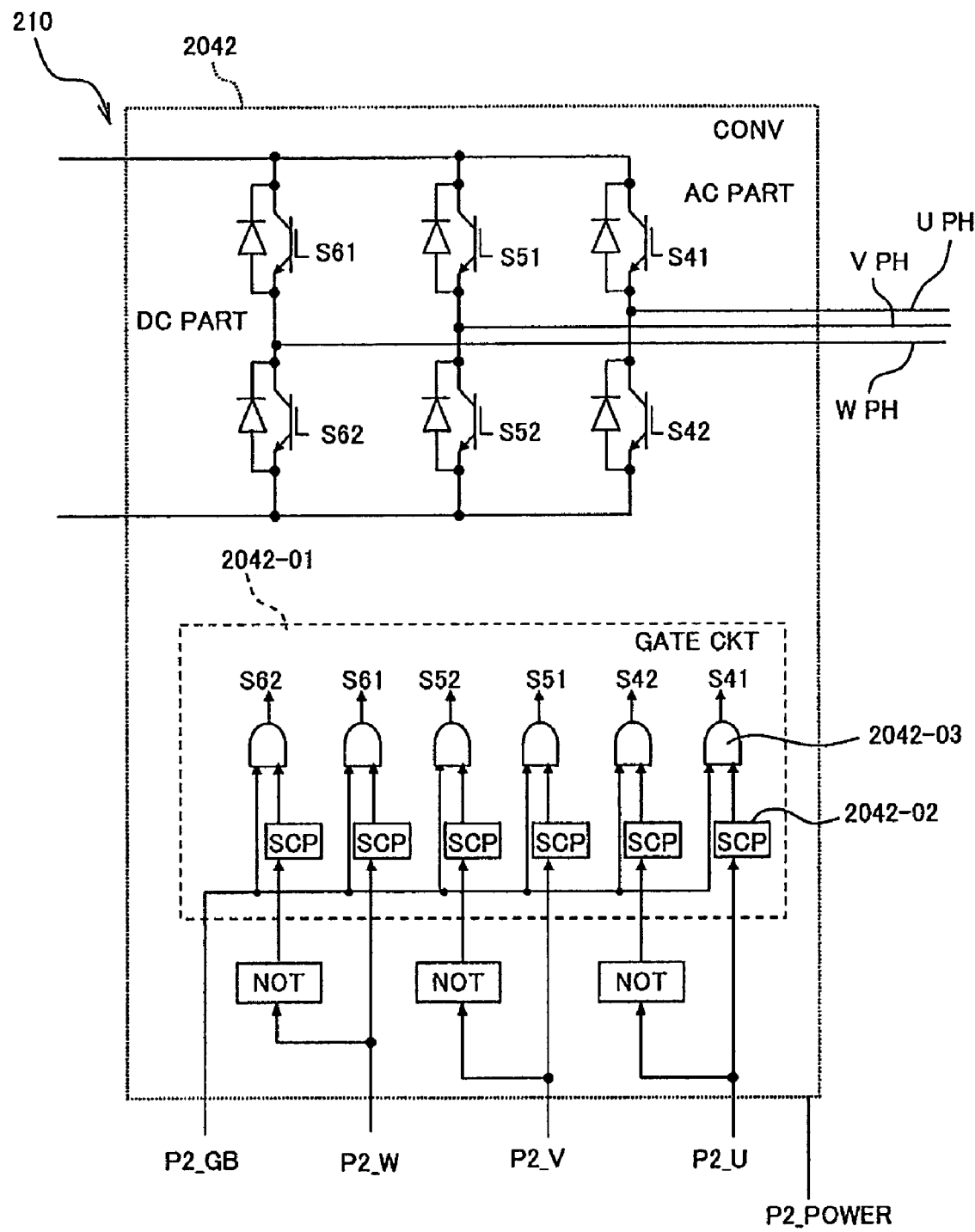
FIG. 4 is a schematic circuit diagram of a generator side converter shown in FIG. 1.

FIG. 4 shows a structure of the generator side converter 2042. The generator side converter 2042 is formed with semiconductor devices similarly to the grid side converter 2041. In the first embodiment, a three-phase converter is exemplified and comprises semiconductor devices (IGBT and diodes) S41, S42, S51, S61, and S62. The semiconductor devices S41 and S42 provides upper and lower arms of U phase, respectively; the semiconductor devices S51 and S52, upper and lower arms of V phase, respectively; and the semiconductor devices S61 and S62, lower arms of W phase, respectively.

Turning on and off these semiconductor devices generates three phases of AC voltages at the AC terminals thereof, and adjusting the AC voltage controls the output current IR as the output of the generator side converter 2042.

The gate signal P2 for turning on and off is supplied from the converter controller 205. The gate signal P2 from the converter controller 205 includes the gate signals of respective phases (three phases), the gate circuit supply power, the gate block signal which are designated with P2_U, P2_V, P2_W, P2_POWER, and P2_GB (subscript U of the gate signal P2 indicates the signal P1_2 for the U phase; the subscript V of the gate signal P2, the signal P2 V for the V phase; and the subscript W of the gate signal P2, the signal P2_W for the W phase).

The lower arm device S42 of the U phase is supplied with a gate signal which is obtained by inverting the gate signal for the upper arm device S41 (when S41 is ON, the device S42 is OFF). Similarly, the lower arms of the V and W phases are supplied with inverted signals of the corresponding upper arms. To generate the inverted signals, invertors (NOT) are used. The gate signals S41 to S62 are provided with time intervals called dead time with short-circuit preventing circuits 2042-02 in the gate circuit to prevent the upper and lower arms from short-circuit (avoid both turning ON simultaneously).

To stop turning on and off of the semiconductor devices, the gate block signal (excessive current detection signal) P2_GB is used. The gate block signal P2_GB is supplied to AND gates 2042-03 together with the pulse signals P2. Since the gate block signal P2_GB is set to "0" to stop switching the gates, the semiconductor devices S41 to S62 are all turned off irrespective of the states of the pulse signals P2.

Figure 5:
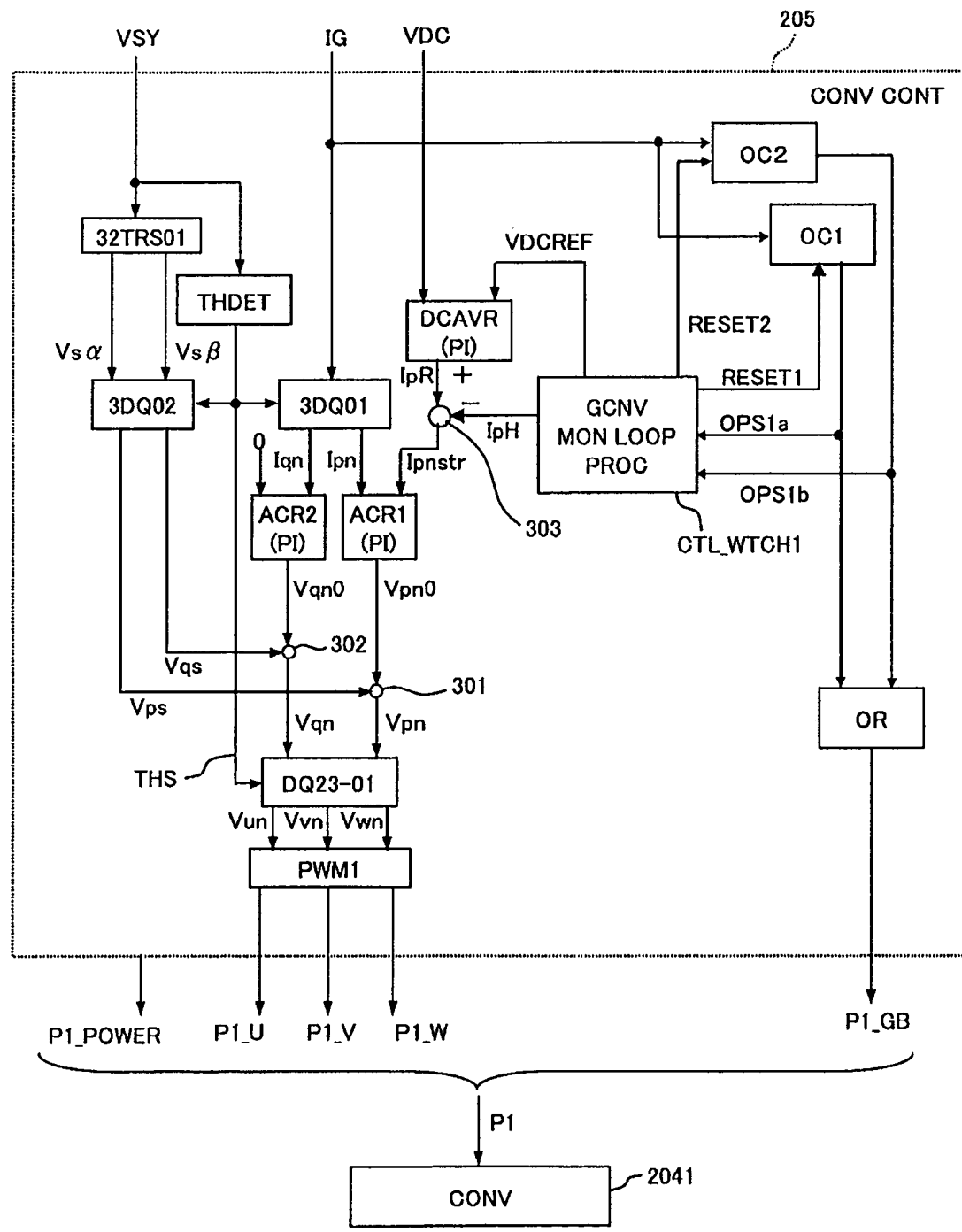
FIG. 5 is a schematic circuit diagram of a first part of a converter controller for the grid side converter shown in FIG. 1.
Figure 6:
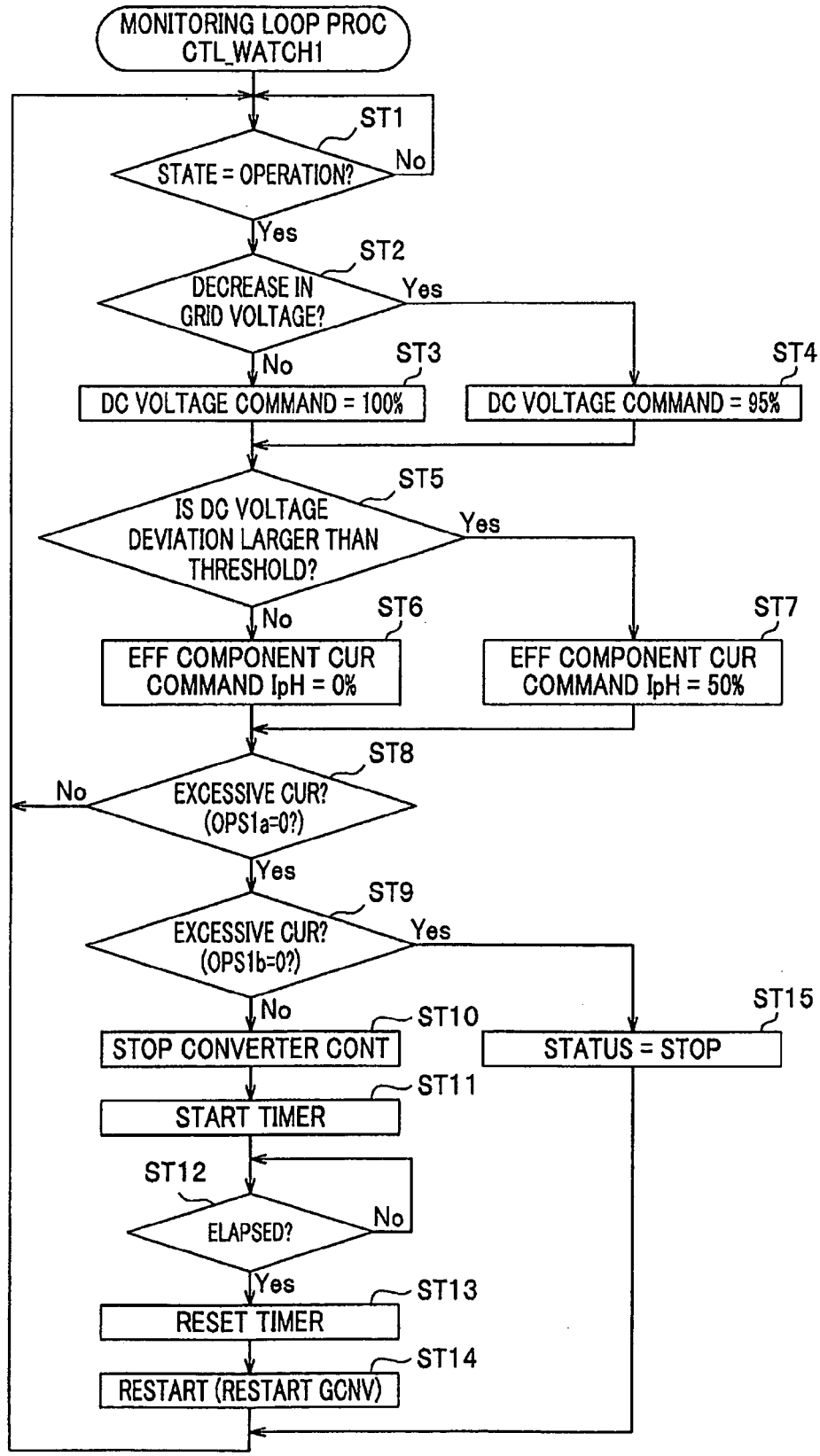
FIG. 6 is a flowchart showing operation of a monitoring loop process for the grid side converter in the converter controller.
Figure 7:
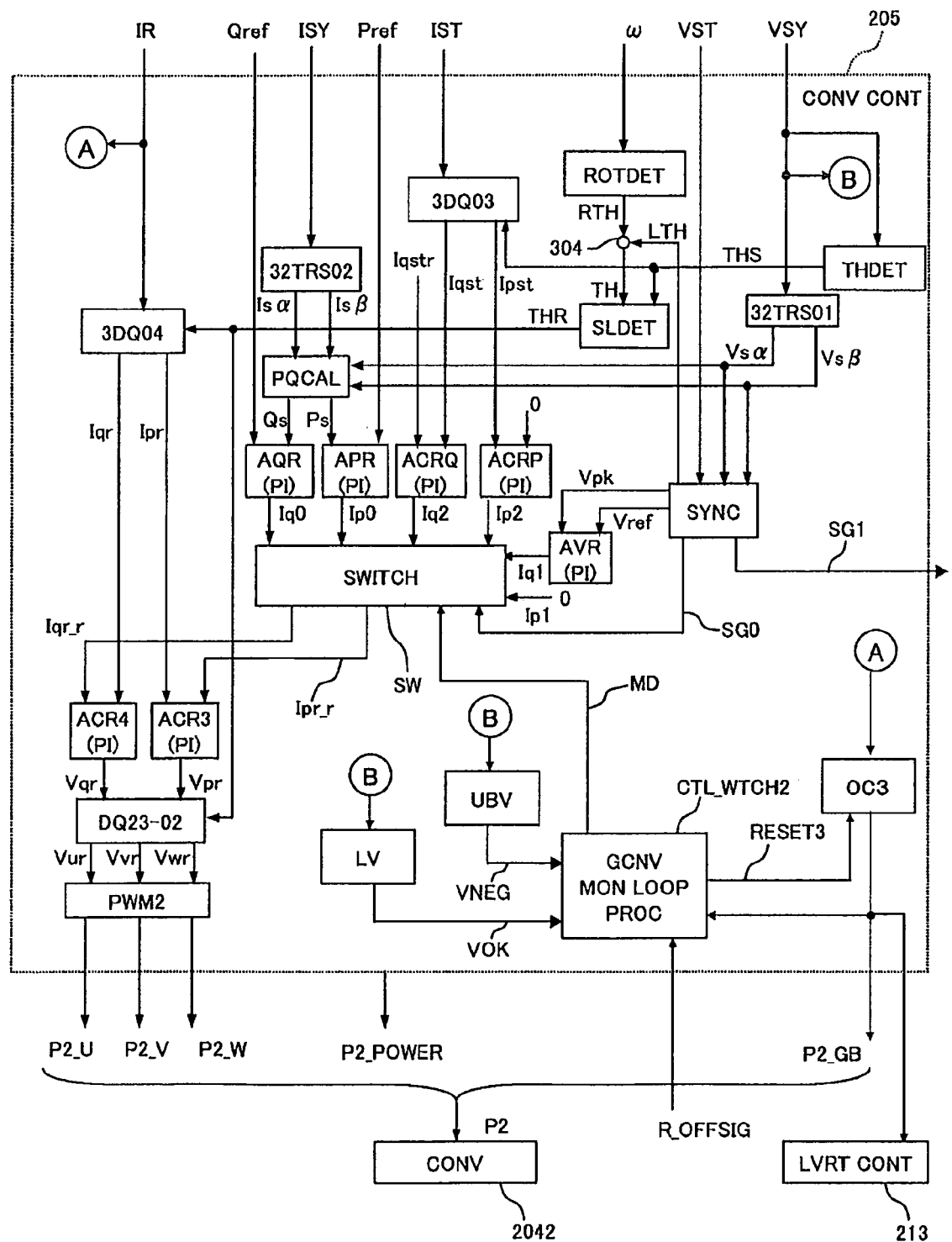
FIG. 7 is a schematic circuit diagram of a second part of the converter controller for the generator side converter shown in FIG. 1.
Figure 8:
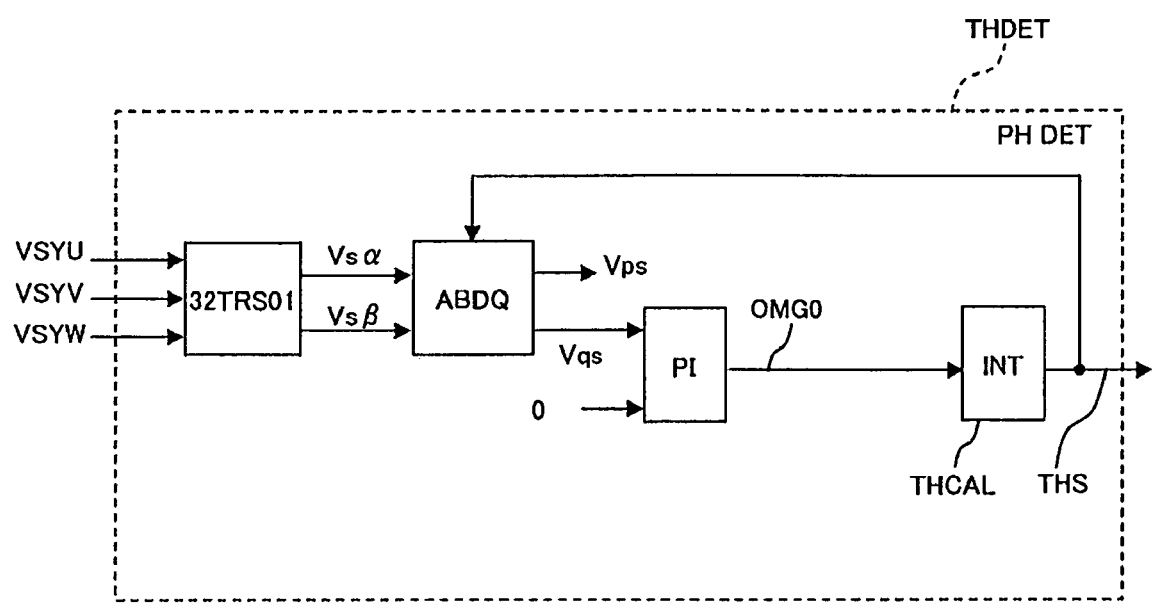
FIG. 8 is a schematic circuit diagram of a phase detector shown in FIGS. 5 and 7.

With reference to FIGS. 5 to 8 will be described a function of the converter controller 205. FIG. 5 shows a first part of the converter controller 205 for the grid side converter 2041, and FIG. 7 shows a second part of the converter controller 205 for the generator side converter 2042. FIG. 8 is a schematic circuit diagram of a phase detector shown in FIGS. 5 and 7. In FIGS. 5, 7, and 8, there are some circuits designated with the same reference. Actually such circuits indicate one circuit to prevent complexity in showing signal flow.

The converter 2041 has a function for keeping the DC voltage VDC of the smoothing capacitor Cd constant. To perform this function, the converter 2041 detects a phase of the grid voltage VSY to control a current with the detected phase of the grid voltage VSY to exchange an active power with the grid to control the DC voltage VDC.

When the DC voltage VDC decreases because the generator side converter 2042 uses a DC power with consumption of energy in the smoothing capacitor Cd, a DC voltage regulator DCAVR of the grid side converter 2041 adjusts an active component current Ipn (active power component) to charge the smoothing capacitor Cd to keep the DC voltage VDC constant. Contrary, when the DC voltage VDC increases because the generator side converter 2042 charges the smoothing capacitor Cd with a DC current, the DC voltage regulator DCAVR in the grid side converter 2041 converts a DC power into an AC power to adjust an active components current Ipn (active power component) to keep the DC voltage VDC constant.

Before the grid side converter 2041 starts operation, charging is made for the DC voltage VDC by an initial charging circuit of the DC voltage (not shown), when a switch-on signal SG2 for contacting in the breaker 209 is outputted by the converter controller 205, the grid side converter 2041 is connected to the grid 10.

The AC voltage detection value VSY is inputted into three-phase-to-two-phase converter 32TRS01. The phase detector THDET calculates the phase signal THS following the grid voltage with, for example, a phase locked loop (PLL) method and sends the phase signal THS (THS: an angular signal if the grid U phase voltage is assumed to be a sine wave) to the three phase rotating coordinate converters 3DQ01 and 3DQ02, the two-phase-to-three-phase rotating coordinate converter DQ23-01. The DC voltage command VDCREF and the DC voltage detection value VDC are applied to the DC voltage regulator DCAVR. The DC voltage regulator DCAVR adjusts an output of a p axis current command (active component current command) IpR so as to make a deviation of the voltage detection value VDC from the DC voltage command VDCREF zero. The adder 303 performs addition or subtraction between the p axis current command IpR and the current command IpH to apply the result Ipnstr to a current regulator ACR1

The output current IG of the grid side converter 2041 is applied to an excessive current detector OC1 and an excessive current detector OC2. Each of the excessive current detector OC1 and the excessive current detector OC2 includes a comparator and a holding circuit (not shown) to change an output value (OPS1$a$, OPS1$b$) thereof to "0" when detecting an excessive current and holds the status. When reset signals (RESET1 and RESET 2) are input, the held statuses of "0" in the excessive current detectors OC1 and OC2 are released, thus the output value being changed into "1".

The excessive current detector OC1 is set to operate in response to a low current level than the excessive current detector OC2.

The excessive current detection signals OPS1$a$ and OPS1$b$ are sent to an OR gate and monitoring loop process CTL_WTCH1. The OR gate effects OR operation between the excessive current detection signals (OPS1$a$ and OPS1$b$) and sends the result P1_GB to the grid side converter 2041.

The monitoring loop process CTL_WTCH1 outputs a DC voltage command VDCREF and an active current command correction quantity IpH.

The three phase rotating coordinate converter 3DQ01 operates from the input current IG a p axis current detection value Ipn (active component current) and q axis current detection value Iqn (reactive current) with the three-phase-to-two-phase conversion equation Eq. 1 and the q axis with rotating coordinate conversion equation Eq. (2) and sends the p axis current detection value Ipn to the current regulator ACR1 and the q axis current detection value Iqn to the current regulator ACR2.

The subscriptions u, v, and w represent respective phase of the three phase alternating current, and for example, a U phase current of the current IG is represented as IGU. Hereinafter, voltages and the like are similarly designated (for example, the U phase of the grid voltage VSY is designated with VSYU).

$$\begin{pmatrix} In\ \alpha \\ In\ \beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} IGU \\ IGV \\ IGW \end{pmatrix} \quad (1)$$

$$\begin{pmatrix} Ipn \\ Iqn \end{pmatrix} = \begin{pmatrix} \sin(THS) & -\cos(THS) \\ \cos(THS) & \sin(THS) \end{pmatrix} \begin{pmatrix} In\ \alpha \\ In\ \beta \end{pmatrix} \quad (2)$$

The current regulator ACR1 adjusts the p axis voltage command Vpn0 so as to make a deviation of the p axis current detection value Ipn from the p axis current command Ipnstr zero and sends the p axis voltage command Vpn0 to an adder 301. Similarly, the current regulator ACR2 adjusts the q axis voltage command Vqn0 so as to make a deviation of the q axis current detection value Iqn from the q axis current command (=0) zero and sends the q axis current command Vqn0 to an adder 302. The current regulators ACR1 and ACR2 comprise, for example, proportional-plus-integral (PI) controllers.

The three-phase-to-two-phase converter 32TRS01 operates an α component Vsα and a β component Vsβ from the input voltage VSY with the conversion equation EQ. (3). The three-phase-to-two-phase converter 32TRS01 calculates and sends p axis voltage detection value (component matching a grid voltage vector) Vps and q axis voltage detection value (a components orthogonal with the p axis voltage detection value Vps) Vqs to the adders 301 and 302, respectively.

$$\begin{pmatrix} Vs\alpha \\ Vs\beta \end{pmatrix} = \frac{2}{3}\begin{pmatrix} \cos(0) & \cos(2\pi/3) & \cos(4\pi/3) \\ \sin(0) & \sin(2\pi/3) & \sin(4\pi/3) \end{pmatrix}\begin{pmatrix} Vsu \\ Vsv \\ Vsw \end{pmatrix} \quad (3)$$

$$\begin{pmatrix} Vps \\ Vqs \end{pmatrix} = \begin{pmatrix} \sin(THS) & -\cos(THS) \\ \cos(THS) & \sin(THS) \end{pmatrix}\begin{pmatrix} Vs\alpha \\ Vs\beta \end{pmatrix} \quad (4)$$

The adder 301 adds the p axis voltage command Vpn0 and the p axis voltage detection value Vps and sends the result Vpn to the two-phase-to-three-phase rotating coordinate converter DQ23-01. Similarly, the adder 302 adds the q axis voltage instruction Vqn0 to the q axis voltage detection value Vqs and sends the result Vqn to the two-phase-to-three-phase rotating coordinate converter DQ23-01.

The two-phase-to-three-phase rotating coordinate converter DQ23-01 inputs the phase signal THS and the results Vpn, Vqn of the adders 301 and 302, and operates and sends voltage command Vun, Vvn, and Vwn to a pulse computing unit PWM1.

$$\begin{pmatrix} Va \\ Vb \end{pmatrix} = \begin{pmatrix} \sin(THS) & \cos(THS) \\ -\cos(THS) & \sin(THS) \end{pmatrix}\begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix}\begin{pmatrix} Va \\ Vb \end{pmatrix} \quad (6)$$

The pulse computing unit PWM1 computes the gate signal P1_U, P1_V, and P1_W for turning on and off by a pulse width modulation n semiconductor devices forming the grid side converter 2041, and sends the result to the grid side power converter 2041.

With reference to FIG. 6, will be described the monitoring loop process CTL_WTCH1.

FIG. 6 shows a flowchart of a monitoring loop process for the grid side converter 2041.

In a step ST1, the monitoring loop process CTL_WTCH1 determines whether an operation status is in operation. If the operation status is not in the operation, processing repeats the step ST1 until the operation status becomes the operation. If the operation status is in the operation, the converter controller 205 determines whether decrease in the grid voltage is detected in a step ST2. When the grid voltage decreases (Yes in the step ST2), the monitoring loop process CTL_WTCH1 decreases the DC voltage command VDCREF by 5% (95%) in a step ST4. This prevents generation of a DC excessive voltage due to energy from the generator side converter 2042. When the grid voltage does not decrease (No in the step ST2), the monitoring loop process CTL_WTCH1 outputs the DC voltage command VDCREF of 100% in a step ST3.

Here, for example, if a capacitance of the capacitor Cd in the DC circuit 210 is increased, this can make the increase in the DC voltage small. However, this results in increase in cost, and thus, decrease in the DC voltage (DC voltage decrease operation) provides a margin against the increase in DC voltage.

In the step ST2, when the grid voltage does not decrease (No in the step ST2), the converter controller 205 does not change a command of DC voltage (100%) in a step ST3.

Further, when the DC voltage increases though the above-mentioned DC decrease operation is made, the active components current command is directly changed (here, a decrease rate of −50% is exemplified). In a normal operation, the active component current command is determined by the DC voltage regulator DCAVR output IpR. However, when suppression of the excessive voltage is performed by the DC voltage regulator DCAVR, a delay occurs in decreasing voltage due to delay in control. Thus, the suppression in the excessive voltage is performed by changing the active component current command to that on a discharging side with detection of a magnitude of a DC voltage deviation (difference between the command and the detection value).

More specifically, in a step ST5, the converter controller 205 determines whether a deviation in the DC voltage from a DC voltage command is greater than a predetermined value. If the deviation in the DC voltage from the DC voltage command is greater than the predetermined value, the converter controller 205 subtracts 50% of the active component current command in a step ST7. If the deviation in the DC voltage from the DC voltage command is not greater than the predetermined value, the monitor loop process subtracts 0% of the active component current instruction in a step ST6.

Further, there is a possibility that an excessive current occurs due to a grid side voltage variation. However, to continue operation as possible as the status allows, there is provided temporary stop of gate control of the grid side converter with an excessive current level 2 smaller than an excessive current protection level 1 of the grid side converter 2041. When an excessive current of the excessive current protection level 2 is detected in a step ST8, gate control of the grid side converter 2041 is temporarily stopped in a step ST10. When gate control is stopped, switching in IGBT devices is stopped. This causes the IGBT devices to operate as rectifiers, resulting in a decrease of the excessive current. After the excessive current of the excessive current level 2 is detected, when an excessive current of the excessive current level 1 is detected in a step ST9, the grid side converter 2041 is stopped in a step ST15 until the excessive current decreases under the excessive current level 1, because the IGBT devices may be damaged. When there is no excessive current of the excessive current level 1, but only the excessive current of the excessive current level 2 is detected, the switching operation is once stopped and restarted in a step ST15 after a predetermined interval (about 1 m and equal to or shorter than 10 ms) elapses in steps ST11, ST12, and ST13.

As mentioned above, decreasing the DC voltage command when the grid voltage decrease is detected provides a wind turbine generating system capable of easily avoiding an excessive voltage status.

Further, when the DC voltage becomes greater than the DC voltage command, the active component current can be directly changed, which provides decrease in the DC voltage faster than the DC voltage control, preventing an excessive voltage due to a response delay, providing the wind turbine generating system capable of easily avoiding the excessive voltage status.

Further, a wind turbine generator system capable of preventing IGBT devices in the grid side converter 2041 from damage and preventing the DC voltage increase by once stopping the switching operation when the excessive current is detected and restarting the switching operation.

With reference to FIG. 7, will be described control of the generator side converter 2042.

The revolution speed signal co indicating a revolution speed and a rotary position of the generator 201 are input into a rotating phase detector ROTDET. In the embodiment an ABZ type rotary encoder is exemplified for generating the revolution speed signal. The rotating phase detector ROTDET counts pulses A and B of the revolution speed signal and converts the results into a phase signal and resets the phase signal (counters) to zero with an index pulse (for example, Z phase pulse in the ABZ type rotary encoder) to generate a phase signal RTH indicating from 0 to 360 degrees and sends the generated phase signal RTH to the adder 303.

The adder 304 adds the phase signal RTH and the phase signal LTH output t by a synchronizing controller SYNC to make a phase signal TH which is sent to an exciting phase calculator SLDET with the phase signal THS (described regarding the grid side converter 2041).

The exciting phase calculator SLDET performs subtraction between the phase signals TH and THS and generates a slip phase signal THR of the rotor by multiplying the result by k of the number of pairs of magnet poles (THR=k(THS−TH) and conversion with a gear ratio.

A power computing unit PQCAL inputs the a axis current Isα and β axis current Isβ converted by the three-phase-to-two-phase converter 32TRS02 from a system current ISY with a transformation matrix identical with Eq. (1), the a axis voltage detection value Vsα and the β axis voltage detection value Vsβ with Eq. (3) and computes an active power Ps and a reactive power Qs with Eq. (7).

$$Ps=3(Vs\alpha \times Is\alpha + Vs\beta \times Is\beta)/2$$

$$Qs=3(-Vs\alpha \times Is\beta + Vs\beta \times Is\alpha)/2 \quad (7)$$

An active power regulator APR inputs the active power Ps and an output power command Pref of the wind turbine generator system 20 to generate an active component current command Ip0 so as to make a deviation of the power detection value Ps from the output power command Pref. Here, an active power instruction is exemplified (active power control). However, in the case where an instruction is made with a torque command (torque control), control can be performed by converting a value of the torque command into the active power command by multiplying the value of the torque instruction by the revolution speed. In the active power control the output power can be kept constant without influence from variation in the revolution speed, although the revolution speed varies, differently to the torque control.

A reactive power regulator AQR inputs the reactive power Qs and the reactive power instruction Qref of the wind turbine generator system 20 and generates an exciting current command Iq0 so as to make a deviation of the active power detection value Qs from the reactive power command Qref zero. The active power regulator APR and the reactive power regulator AQR comprise, for example, proportional pulse integrators.

The active component command Ip0 of the active power regulator APR and the exciting current command Iq0 of the reactive power regulator AQR are input into a switch SW.

A stator current IST is applied to a three phase rotating coordinate converter 3DQ03 which separates an active component current Ipst and a reactive component current Iqst by conversion equations Eqs. (1) and (2), which are input into generator current regulators ACRP and ACRQ.

The generator current regulator ACRP further inputs zero as a stator active current command, computes a rotor current command Ip2 so as to make an active component Ipst of the stator current zero, and sends the rotor current command Ip2 to the switch SW. The generator current regulator ACRQ inputs a stator reactive current command Iqstr and computes a rotor current command Iq2 so as to equalize the reactive component current Iqst to the command and sends the rotor current command Iq2 to the switch SW. The stator reactive current command Iqstr is given by, for example, a function of a grid voltage decrease quantity and set to supplying a reactive current to the grid 10 when the grid voltage decreases.

Next will be described the voltage regulator AVR. The voltage regulator AVR is supplied with an amplitude value Vpk of the stator voltage VST as a feedback value and a value Vref calculated from an amplitude of the grid voltage VSY and generates and sends to the switch SW an exciting current command Iq1 so as to make a deviation of the amplitude value of the stator voltage VST from the command zero. Here, the voltage regulator AVR comprises, for example, a proportional plus integral controller. The voltage regulator AVR is operated in a status where the breaker 208 is open and controls the exciting current command for allowing a current to flow through the secondary side of the generator 201 from the generator side converter 2042 to equalize an amplitude of the stator voltage of the generator 201 to an amplitude value of the grid voltage.

The output current IR of the generator side converter 2042 is also input into an excessive current detector OC3. The excessive current detector OC3 comprises a comparator and a holding circuit (not shown). When detecting an excessive current, the excessive current detector OC3 changes a value of the gate block signal P2_GB to "0" and holds "0". When a reset signal RESET3 is input, the held value of the gate block signal P2_GB is released and changed to "1".

The excessive current detection signal (gate block signal) P2_GB is sent to a monitoring loop process CTL_WTCH2 and the generator side converter 2042. The monitoring loop process CTL_WTCH2 generates and sends an operation mode signal MD to the switch SW.

An inverse voltage component detector UBV inputs the grid voltage VSY and calculates a magnitude of the inverse voltage VNEG from a difference between a maximum r.m.s. value and a minimum r.m.s. value from each of three-phase voltages and sends the result to the monitoring loop process CTL_WTCH2.

With reference to FIG. 8 will be described the phase detector THDET. The phase detector THDET inputs the grid voltages VSY, VSYV, and VSYW, and the three-phase-to-two-phase converter 32TRS01 performs calculation in accordance with Eq. (3) to convert the grid voltage into voltage signals Vsα and Vsβ of two phases. A rotating coordinate converter ABDQ inputs the voltage signals Vsα and Vsβ of two phases to calculate Vps and Vqs with the coordinate transforming equation of Eq. (4). When the calculated phase THS accords to a U phase of the grid voltage, using a fact that the Vqs becomes zero, a phase is corrected. Accordingly, the Vqs is compared with zero to generate the frequency correcting instruction OMG0 by a circuit PI. The frequency correcting command OMG0 is input into an integrator THCAL which integrates the frequency correcting command OMG0 to convert the frequency correcting command OMG0 into the phase signal THS.

Figure 9:
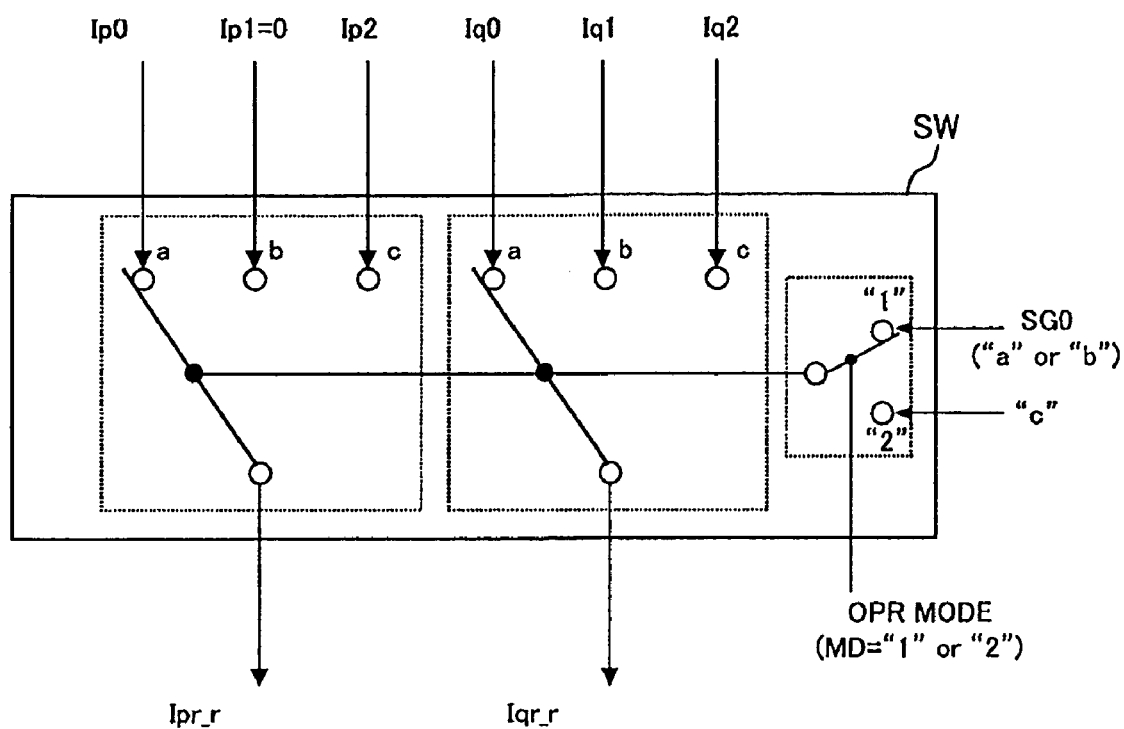
FIG. 9 is a schematic circuit diagram of a switch shown in FIG. 7.

FIG. 9 shows configuration of the switch SW. The switch SW determines either of a normal generation mode (switch position is "a") where outputs of the power regulators APR and AQR (Ip0 and Iq0) are used; a grid synchronizing operation mode (switch position is "b") where zero is used as the active component current command and the output Iq1 is used as the exciting current command (switch position "b"); or a power system failure operation mode (switch position is "c" where the outputs Ip2 and Iq2 of the stator current regulators ACRP and ACR for controlling the stator current of the generator 201).

Before the breaker 208 is made contact (during voltage synchronizing operation for synchronizing the stator voltage with the grid voltage with the control switch signal SG0="b"), the switch SW uses zero as the active component current command (Ip1=0) and the output Iq1 of the voltage regulator AVR as the exciting current command. After the breaker 208 is made contact (the control switch signal SG0="a"), the switch SW selects the output Ip0 and Iq0 of the active power regulator APR and the reactive power regulator AQR. When the normal generation operation is conducted, the operation mode signal MD is "1", switching is made in response to the switch control signal SG0. However, when the operation mode signal MD="2" due to detection of the power system failure or the like, the rotor current command Ip2 of the active power regulator ACRP and the rotor current command Iq2 of the reactive power regulator ACRQ for the stator are selected and outputted.

The synchronizing controller SYNC shown in FIG. 7 has functions for determining whether the voltage amplitude of the generator 201 is synchronized with the grid voltage from the grid voltage detection value Vsref and the stator voltage detection value Vgpk while the breaker 208 is in an open status; outputting a phase correcting signal LTH for correcting a phase of the stator voltage toward the grid voltage when the grid voltage is different in phase from the stator voltage; and determining whether synchronization is established by determining the phase difference between the grid voltage and the stator voltage is in a predetermined range, to output the switch-on signal SG1 and the control switch signal SG0. When the breaker 208 is in a closing status in response to the switch-on signal SG1, the synchronizing controller SYNC holds a value of the phase correcting signal LTH.

These function of the synchronizing controller SYNC provides synchronization of the generated voltage with the grid voltage before coupling the generator 201 to the grid 10 and, after coupling the output of the generator 201 is coupled to the grid 10, can immediately switch the control to power control.

The three phase rotating coordinate converter 3DQ04 calculates a q axis current detection value Iqr (exciting current component) and p axis current detection value Ipr (active current component) and sends the q axis current detection value Iqr to a current regulator ACR4 and the p axis current detection value Ipr to the current regulator ACR3.

$$\begin{pmatrix} Ir\alpha \\ Ir\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \quad (8)$$

$$\begin{pmatrix} Ipr \\ Iqr \end{pmatrix} = \begin{pmatrix} \sin(THR) & -\cos(THR) \\ \cos(THR) & \sin(THR) \end{pmatrix} \begin{pmatrix} Ir\alpha \\ Ir\beta \end{pmatrix} \quad (9)$$

The current regulator ACR4 controls a q axis voltage command Vqr so as to make a deviation of the q axis current detection value Iqr from the a q axis current command Iq1, Iq0, or Iq1. Similarly, the current regulator ACR3 controls a p axis voltage command Vpr as an output thereof so as to make a deviation of the p axis current detection value Ipr from the p axis current command Ip1, Ip0, or Ip2. The current regulators ACR3 and ACR4 comprise, for example, proportional plus integral controllers.

The p axis voltage command Vpr and the q axis voltage detection value Vqr are input into the two-phase-to-three-phase rotating coordinate converter DQ23-02, which calculates voltage commands Vur, Vvr, and Vwr as outputs thereof from phase signal THR and the respect input values with the conversion equations Eqs. (10) and (11) and sends the results to a pulse computing unit PWM2.

$$\begin{pmatrix} Va \\ Vb \end{pmatrix} = \begin{pmatrix} \sin(THr) & \cos(THr) \\ -\cos(THr) & \sin(THr) \end{pmatrix} \begin{pmatrix} Vpr \\ Vqr \end{pmatrix} \quad (10)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (11)$$

The pulse computing unit PWM2 computes gate signals P2_U, P2_V, and P2_W for switching the semiconductor devices forming the generator side converter 2042 on and off in response to the input voltage commands Vur, Vvr, and Vwr by a pulse width modulation method and sends the result to the generator side converter 2042.

Figure 10:
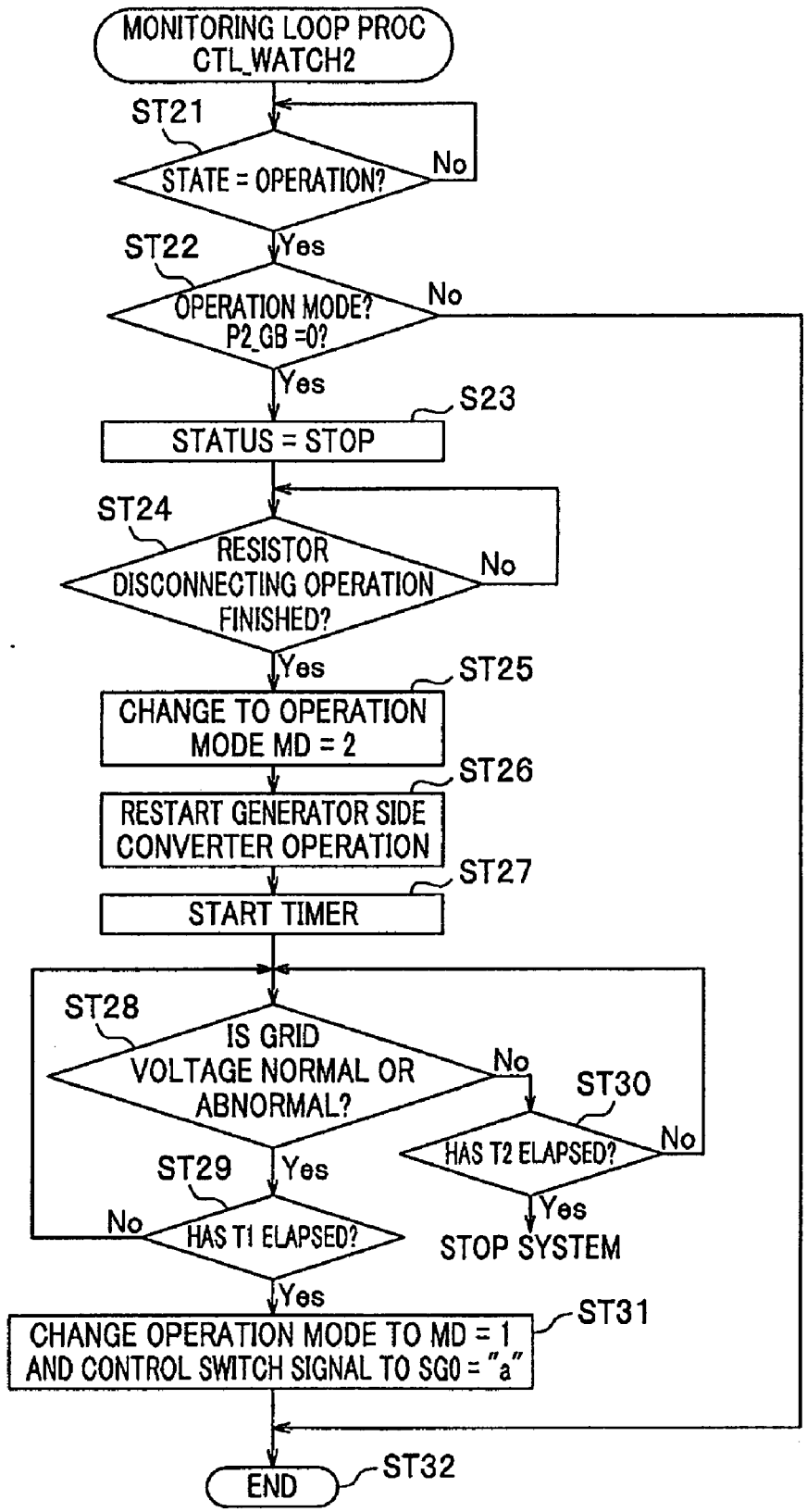
FIG. 10 is a flowchart showing operation of a monitoring loop process for the generator side converter in the converter controller.

FIG. 10 is a flowchart showing the monitoring loop process for control in the generator side converter 2042. As described with FIG. 7, when a rotor excessive current is detected, the gate block signal (operation status signal) is input into the monitoring loop process CTL_WTCH2 for monitoring an excessive current upon a power system failure. When an excessive current in the rotor is detected during operation, the generator side converter 2042 and the generator control described with FIG. 7 are in a stop status and the generator side converter 2042 moves to a stop status of the switching on and off operation.

When the status transients from the operating status to the stop status in response to detection of the gate block signal P2_GB=0 in steps S21 to ST23, the monitoring loop process monitors a resistor off (disconnection) status from a resistor status signal R_OFFSIG in a step ST24. When the operation has finished (Yes in the step ST24), the operation mode is changed to MD=2 to restart the operation of the generator side converter 2042 in steps ST25 to ST27 and starts a timer in a step S27. In this event, to release the gate block signal P2_GB indicating the excessive current, a release signal RESET3 is outputted to reset the excessive current detector OC3.

In the following step ST28, it is determined whether the grid voltage is normal or abnormal. If the grid voltage is normal (Yes in the step ST28) and a predetermined interval T1 has elapsed in steps ST29 and ST30, the operation mode MD is changed to MD=1 and the control switch signal SG0 is changed to SG0=a in a step ST31 to restore the status from the power system failure response control status. If the grid voltage is abnormal and a predetermined interval T2 has elapsed (Yes in a step ST30), the system is stopped. If the grid voltage is abnormal, but a predetermined interval T2 has not elapsed in the step ST30, processing returns to step ST28.

As mentioned above, stopping the gate switching in the generator side converter 2042 before the power system failure response circuit 212 is operated can divert the rotor currents to the power system failure response circuit 212.

Further, the generation operation can be restarted without allowing the currents outputted by the generator side converter 2042 flowing through the power system failure response unit 212 by restarting the operation of the generator side converter 2042 after completion of turning off operation of resistors.

With reference to FIGS. 11 to 16 will be described the power system failure response unit 212.

Figure 11:
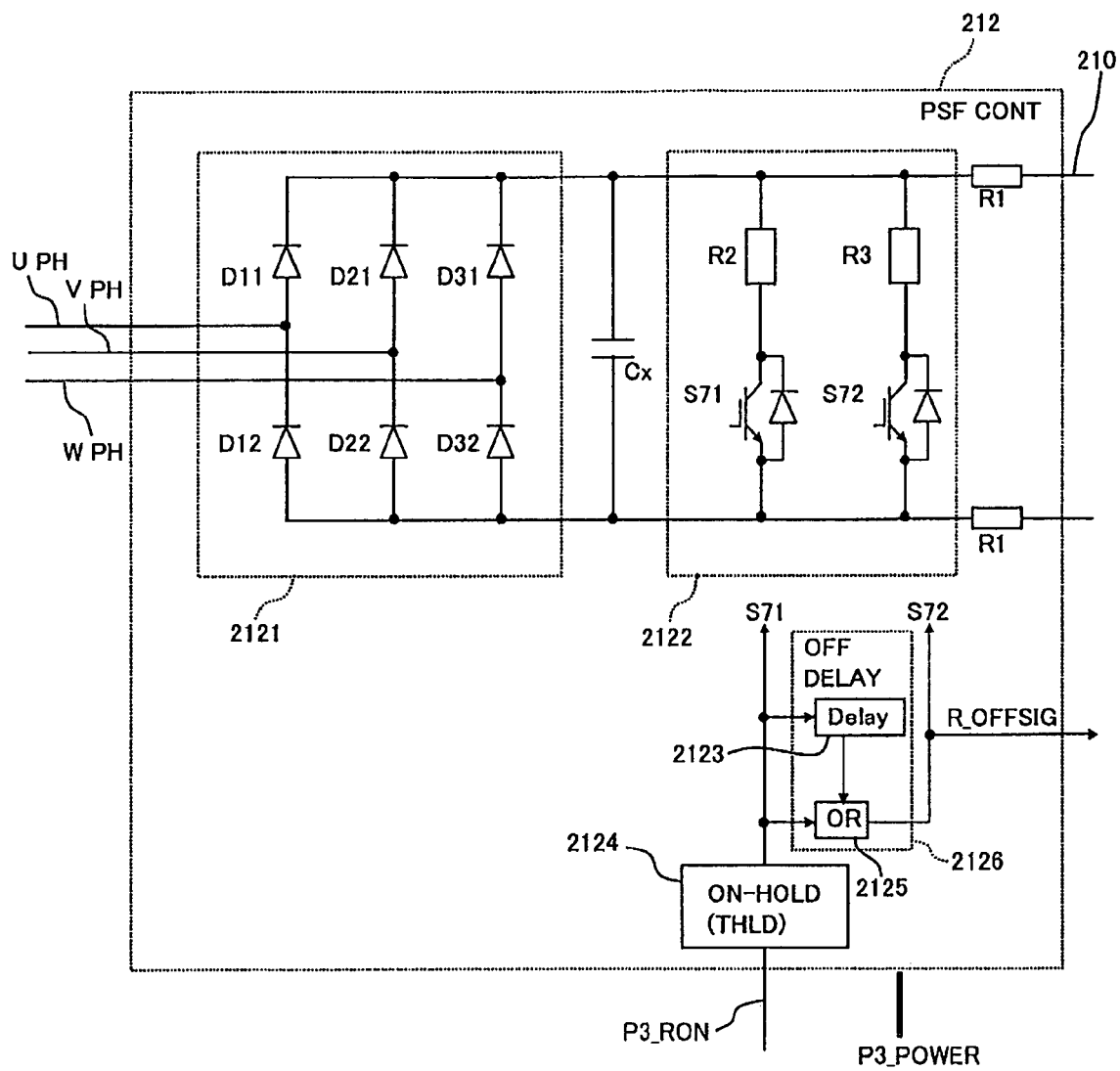
FIG. 11 is a schematic circuit diagram of a power system failure response circuit shown in FIG. 1.

FIG. 11 shows a circuit configuration of the power system failure response unit 212. The power system failure response unit 212 mainly includes a rectifier 2121 and an energy consuming unit (short-circuiting circuit) 2122. An AC input of the rectifier 2121 is connected to a point between the reactor 215 and converter 2042 to be coupled to secondary winding terminals of the generator 201. Here, a rectifier 2121 comprising diodes D11, D12, D21, D22, D31, and D32 is exemplified.

The rectifier 2121 includes a capacitor Cx at a DC part thereof. Further the DC part includes an energy consuming circuit 2122 including a circuit including semiconductor switches S71 and S72 connected to resistors R2 and R3, respectively. Positive and negative terminals of the energy consuming circuit 2122 and the DC circuit 210 of the converter unit 204 are connected through resistors R1.

When being in a stop status, the gates in the generator side converter 2042 operate as diode rectifiers. When an excessive current is generated in the rotor of the generator 201, stopping the gates in the generator side converter 2042 and turning on the semiconductor devices S71 and S72 in the DC part of the power system failure response unit 212 results in that an impedance of the power system failure response unit 212 becomes lower than that of the generator side converter 2042 operating as a diode rectifier. This decreases a quantity of current, diverted from the excessive current, flowing into the generator side converter 2042, which prevents the semiconductor switching devices from damage by the excessive current. In this operation, energy flowing into the DC part of the power system failure response unit 212 from three phase AC is consumed by the resistors R2 and R3. To make the resistors R2 and R3 for consuming the energy smaller, preferably, the number of times of successive shunting operation (per unit interval) of the power system failure response unit 212 is limited. Thus it is preferable for practical use that the shunting operations (cycles from connecting to disconnecting the resistors) are limited to twice or three times (within a unit interval). When the number of the shunting operation exceeds a limit, the controller 205 stops the switching operation.

The gate signal P3_RON for turning on and off the semiconductor devices S71 and S72 is supplied from the power system failure response circuit controller 213. The gate signal P3_RON is input into the ON status holding circuit 2124. The ON status holding circuit 2124 has a function for changing the output signal S71 to an ON status for a predetermined time interval from when the gate signal P3_RON becomes the ON status. This turns on the switch S71 to conduct the registers R2 for a predetermined interval. The output signal S71 is also applied to an off-delay circuit 2126. The off-delay circuit 2126 includes a delay 2123 outputting a delayed signal of the signal S71 and an OR gate which is also supplied with the signal S71 and generates a signal R_OFFSIG supplied to the semiconductor device S72 of which off timing is delayed by an off delay interval TD. When the signal S72 is ON, the resistor R3 is conducted. Accordingly, both the resistors R2 and R3 simultaneously conduct, and the register R2 is disconnected prior to the resistor R3. With a delay, the resistor R3 is disconnected. In this embodiment, only two resistors R2 and R3 are exemplified. However, the number of the resistors may be changed to three or more, which provides a further stepwise short-circuit operation by changing delay intervals.

Further, the operation signal R_OFFSIG indicating a resistor which is lastly disconnected is transmitted to the converter controller 205 shown in FIG. 7.

Figure 12:
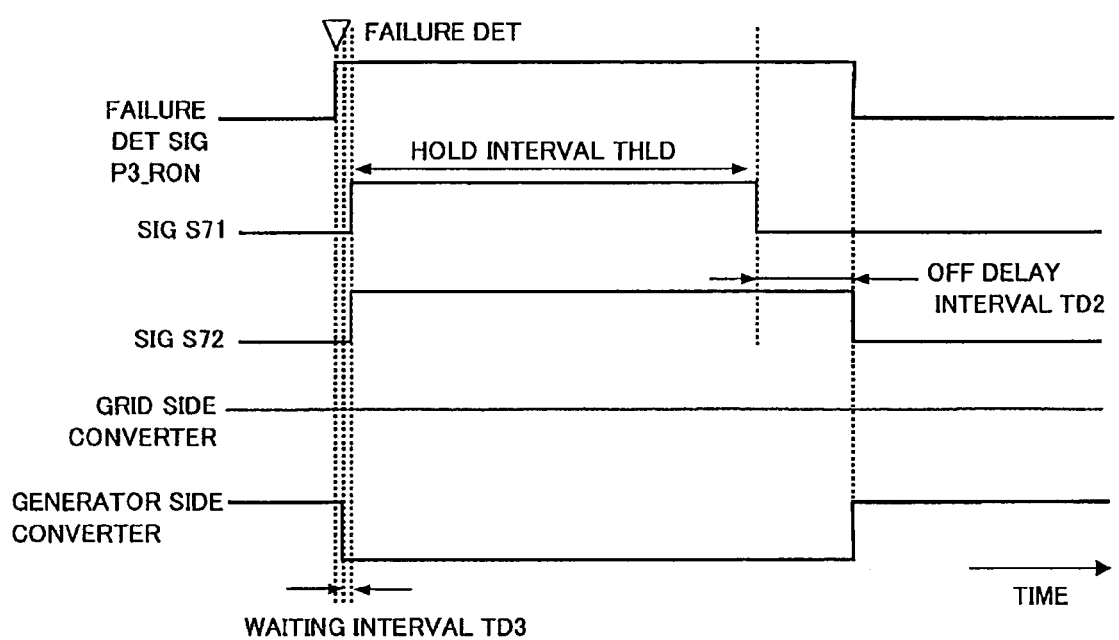
FIG. 12 is a time chart showing operation of the power system failure response circuit shown in FIG. 1.

With reference to FIG. 12 will be further described the operation of the circuit shown in FIG. 11. First, when a power system failure is detected, the detection signal P3_RON changes from 0 to 1. According to the structure shown in FIG. 11, the signals to the semiconductor devices S71 and S72 become ON simultaneously with a waiting interval TD3 and the signal to the semiconductor device S72 becomes OFF with a delay interval TD2 after the signal to the semiconductor device S71 becomes OFF. Accordingly, the resistors R2 and R3 are simultaneously connected and this status continues for a hold interval THLD. After that, the resistor R2 is disconnected and with the OFF delay interval TD2, the resistor R3 is disconnected.

Preferably, a resistance of the resistor R1 is determined such that a time constant TCR (=R1 [Ω]×Cd [F]) of a DC series circuit of the capacitor Cd in the DC circuit 210 in the converter unit 204 and the resistor R1 is greater than the hold interval THLD. For example, the hold interval THLD is 100 ms, the time constant TCR is preferably greater than 100 ms. This reduces a decrease in the DC voltage in the converter unit 204 when the semiconductor devices S71 and S72 are turned ON.

Figure 13:
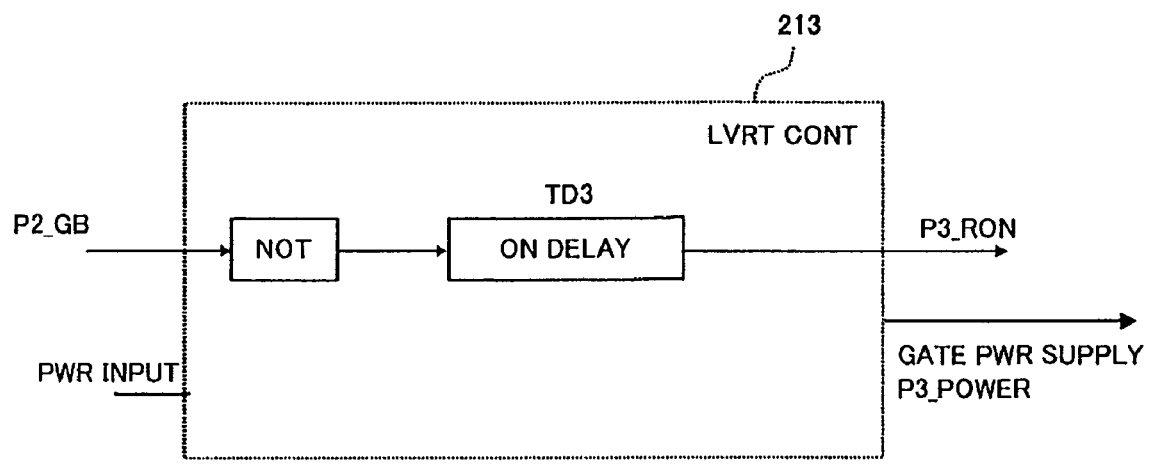
FIG. 13 is a schematic circuit diagram of a power system failure response circuit controller show in FIG. 1.

With reference to FIG. 13 will be described a configuration of the power system failure response circuit controller 213 for the power system failure response unit 212.

The power system failure response circuit controller 213 includes an inverter NOT and an ON-delay circuit TD3 and is supplied with the gate block signal P2_GB. When receiving the gate block signal P2_GB, the power system failure response circuit controller 213 generates and sends a signal P3_ON for connecting the resistors R2 and R3 to the power system failure response unit 212 after a predetermined time TD3 set in the ON-delay circuit TD3 elapsed.

This surely prevents the registers R2 and R3 from conducting during the operation of the generator side converter 2042.

Second Embodiment

Figure 14:
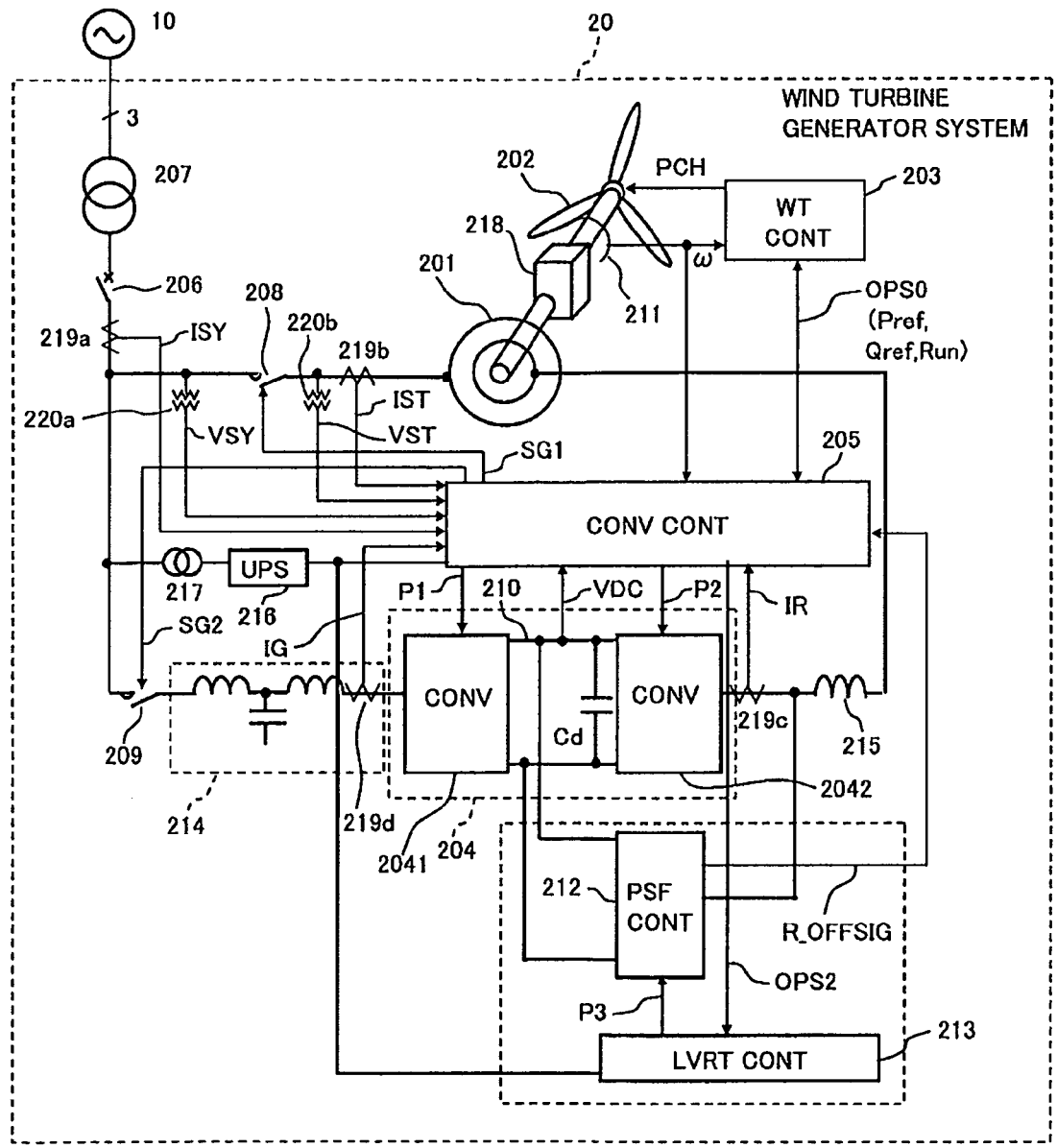
FIG. 14 is a block diagram of a wind turbine generator system according to a second embodiment of the present invention.

FIG. 14 shows a second embodiment of the present invention. A wind turbine generator system according to the second embodiment is different in that the converter controller 205 directly transmits a resistor connecting signal OPS2 to the power system failure response circuit controller 213. In the first embodiment, the ON status holding circuit 2124 in the power system failure response circuit 212 determines timing of connecting and disconnecting the resistor R2. In the second embodiment, the resistor connecting signal OPS2 outputted by the converter controller 205 determines timing of connecting and disconnecting the resistor R2.

Figure 15:
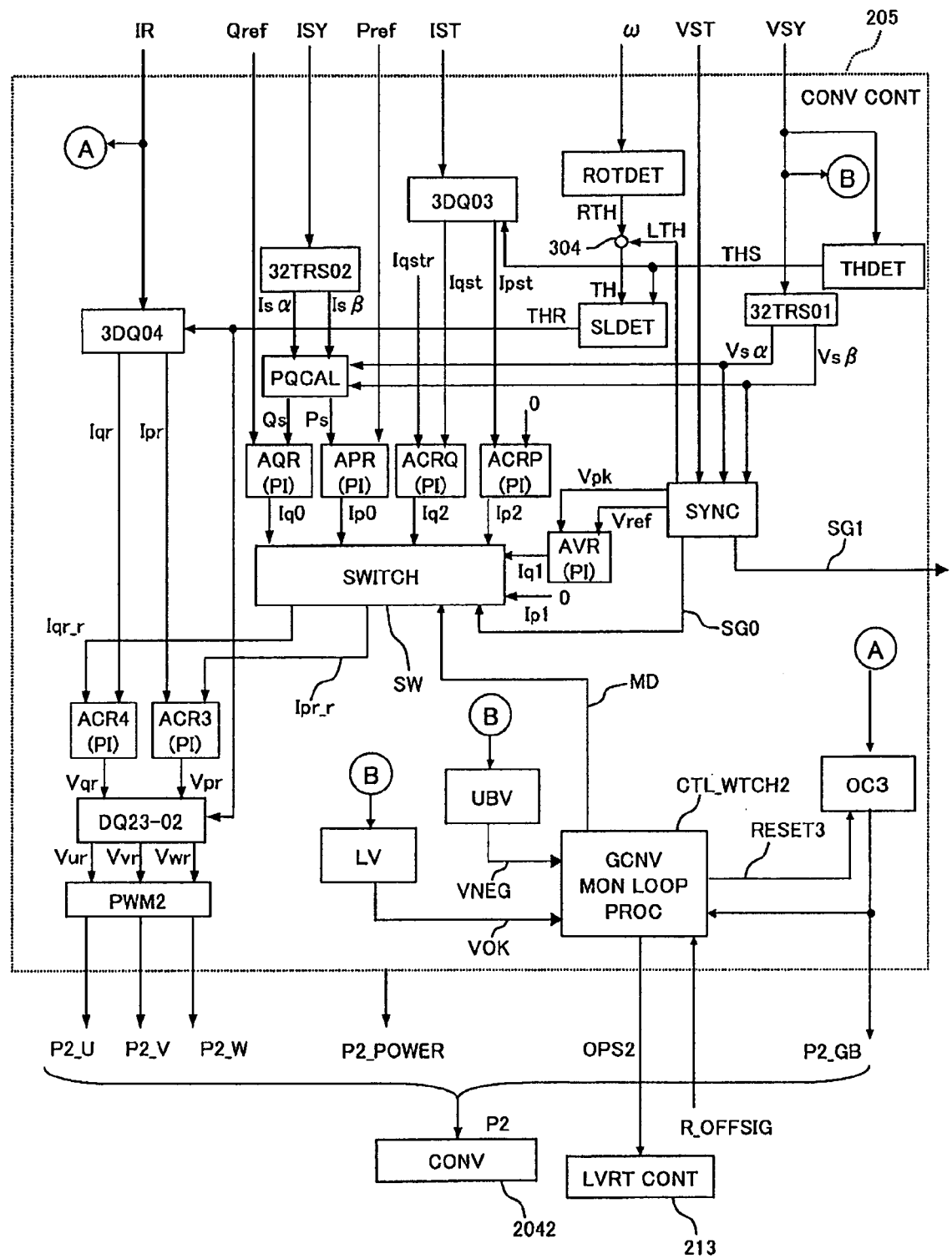
FIG. 15 is a schematic circuit diagram of a grid side converter shown in FIG. 14.

FIG. 15 shows configuration of the converter controller 205. The converter controller according to the second embodiment is different from that according to the first embodiment shown in FIG. 1 is that the monitoring loop process CTL_WTCH2 generates and sends the resistor connecting signal OPS2 to the power system failure response circuit 212.

Figure 16:
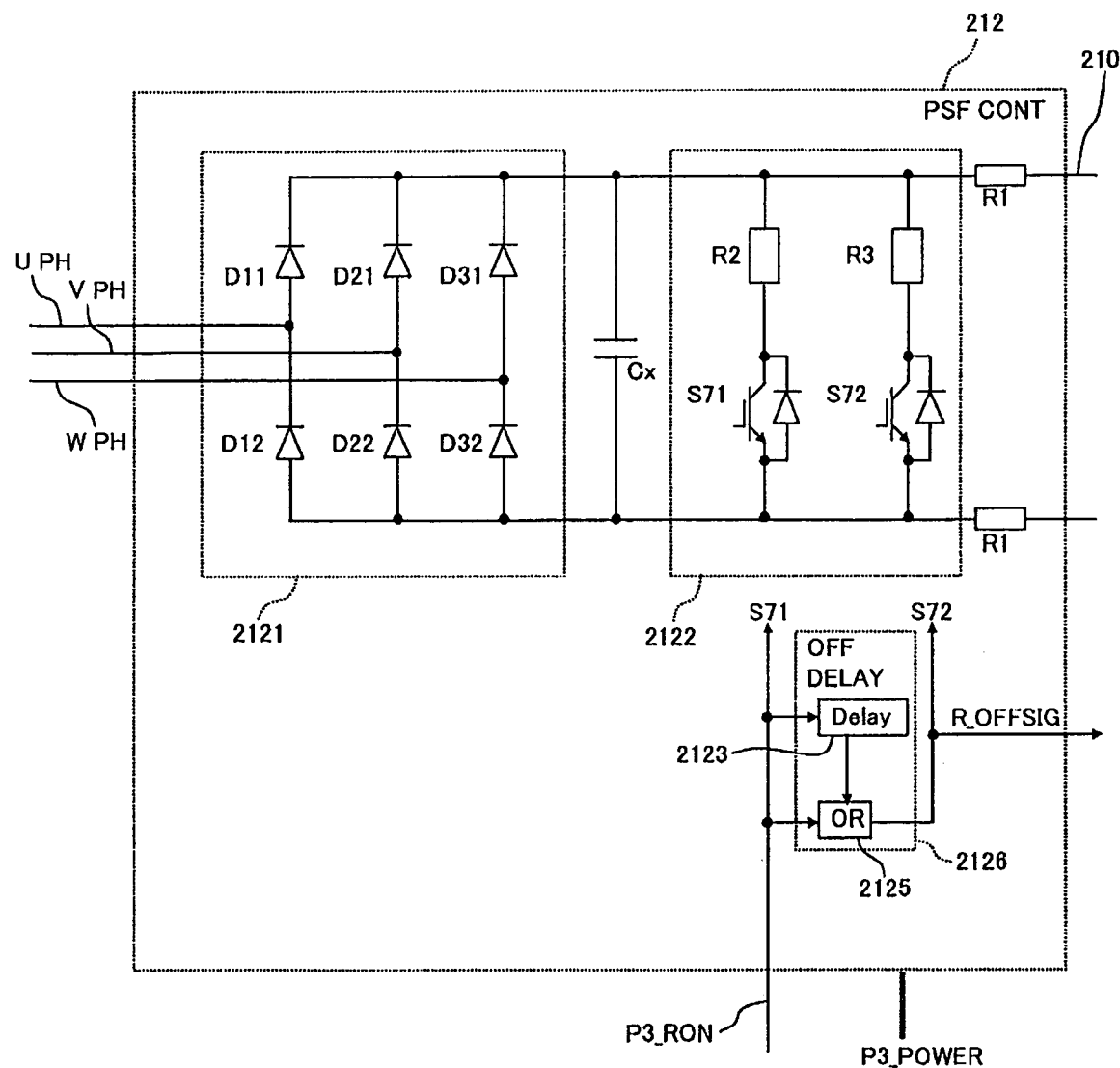
FIG. 16 is a schematic circuit diagram of a power system failure response circuit shown in FIG. 14.

FIG. 16 shows configuration of the power system failure response circuit 212. The power system failure response circuit 212 according to the second embodiment shown in FIG. 16 is different from that according to the first embodiment shown in FIG. 11 in that the ON status holding circuit 2124 shown in FIG. 11 is eliminated because in the second embodiment, the resistor connecting signal OPS2 defining timings of connecting and disconnecting the resistor R2 is used.

Figure 17:
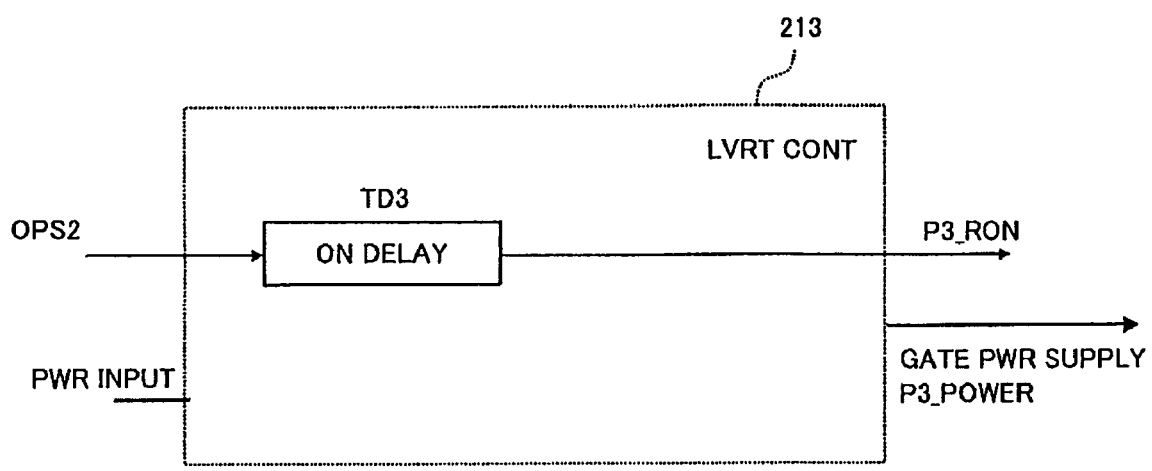
FIG. 17 is a schematic circuit diagram of a power system failure response circuit controller shown in FIG. 14.

FIG. 17 shows configuration of the power system failure response circuit controller 213. The power system failure response circuit controller 213 according to the second embodiment shown in FIG. 17 is different from that according to the first embodiment shown in FIG. 13 is in that the resistor connecting signal OPS2 is used in place of the excessive current detection signal P2_GB and an inverter NOT is not used.

Figure 18:
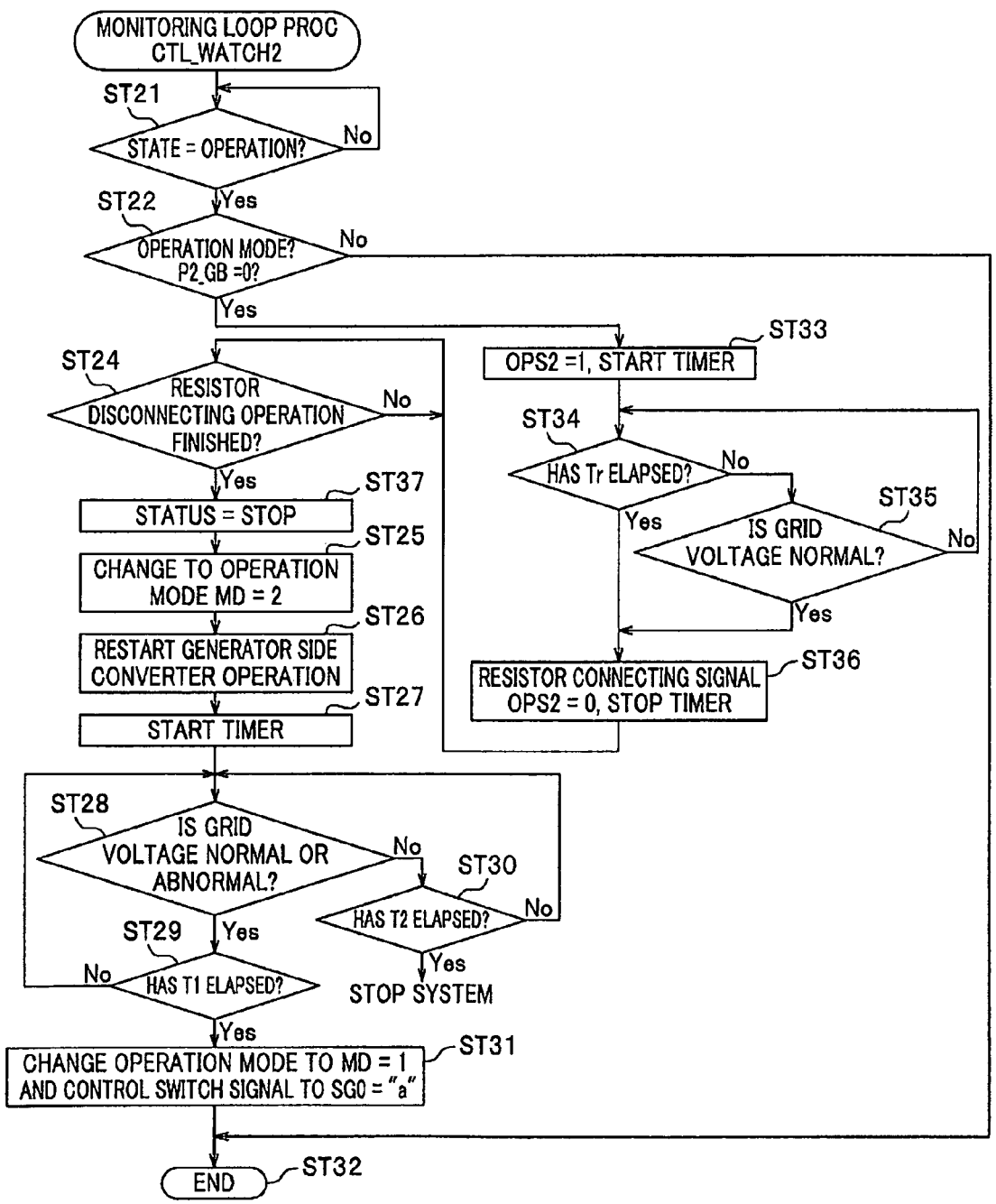
FIG. 18 is a flowchart showing operation of a monitoring loop process for the generator side converter in the converter controller according to the second embodiment.

FIG. 18 is a flowchart showing control of the generator side converter 2042 according to the second embodiment. The generator side converter 2042 according to the second embodiment performs, during an operating status, monitoring operation for monitoring an excessive current upon the grid power failure. When the value of the excessive current detection signal is 1 (P2_GB=1), it is determined that there is no excessive current and finishes monitoring loop. The flowchart in FIG. 18 includes the same steps in addition to the steps shown in FIG. 10. Thus, added steps will be mainly described.

When it is detected that the excessive current detection signal (gate block signal) P2_GB=0 in the step ST22, where the gates in the generator side converter 2042 has already been in a stop status, the power system failure response circuit controller 213 sets the OPS2 for connecting the resistor R2 in the power system failure response circuit 212 to "1" as well as starts a timer in a step ST33. The timer monitors a maximum interval for when the resistor R2 is connected. When the maximum interval for which the resistor R2 is connected has elapsed in steps ST34 and ST35, the power system failure response circuit 212 makes the OPS2=0. When the resistor is disconnected in a step ST36, the resistor R3 is disconnected with a delay by OFF DELAY 2125 from the disconnection of the resistor R2.

After connecting the resistors R2 and R3, the timer starts, for a predetermined interval, for example, 150 ms, the power system failure response circuit 212 monitors whether the grid voltage is restored to a normal value, i.e., 100%±10% of the standard grid voltage, the power system failure response circuit 212 resets the timer, processing moves to successively disconnecting operation of the resistors R2 and R3. Accordingly, when the grid voltage returns to the normal value, the resistors are subject to disconnection operation, and when the grid voltage does not return to the normal value of the grid voltage, after the interval Tr, the disconnection operation of the resistors is performed.

As mentioned above, when the grid voltage rapidly returns to the normal value which is detected by monitoring the status of the grid voltage, timing of disconnecting the resistors is made earlier, which is a different point from the first embodiment shown in FIG. 10.

As mentioned above, making the timing of start of disconnection of the resistors earlier in response to restoration of the grid voltage shortens an interval for which the resistors are connected to the rotor to eliminate additional connection interval of the resistors to shorten an interval of restoration to the normal operation.

Third Embodiment

Figure 19:
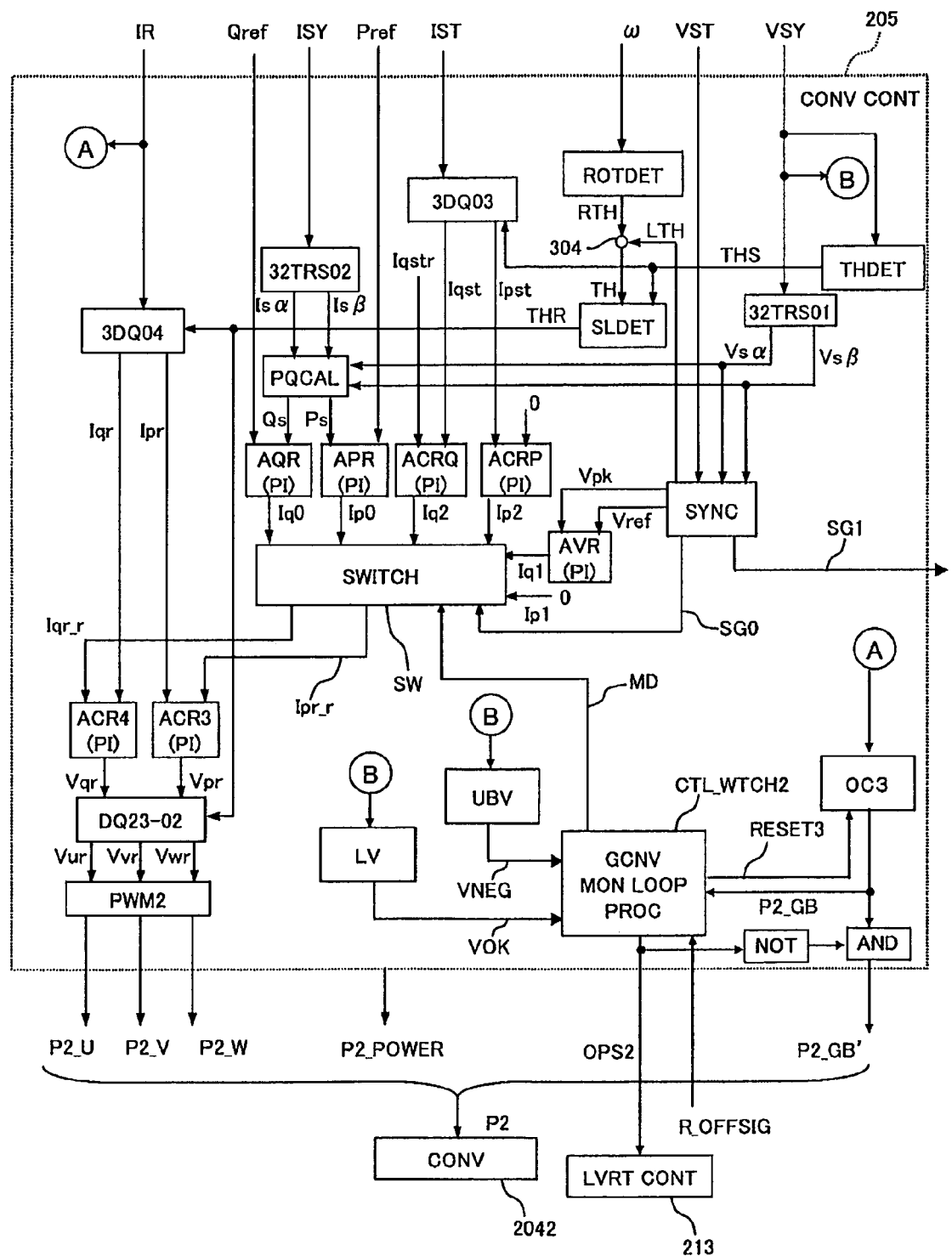
FIG. 19 is a schematic circuit diagram of a grid side converter according to a third embodiment.

FIG. 19 shows the converter controller 205 according to a third embodiment. The converter controller 205 according to the third embodiment is different from that shown in FIG. 15 is in that an inverter (NOT) and an AND gate (AND) are added to make the excessive current detection signal P2_GB in a stop status of "0" to monitor an excessive current upon the power system failure in an operation status.

Figure 20:
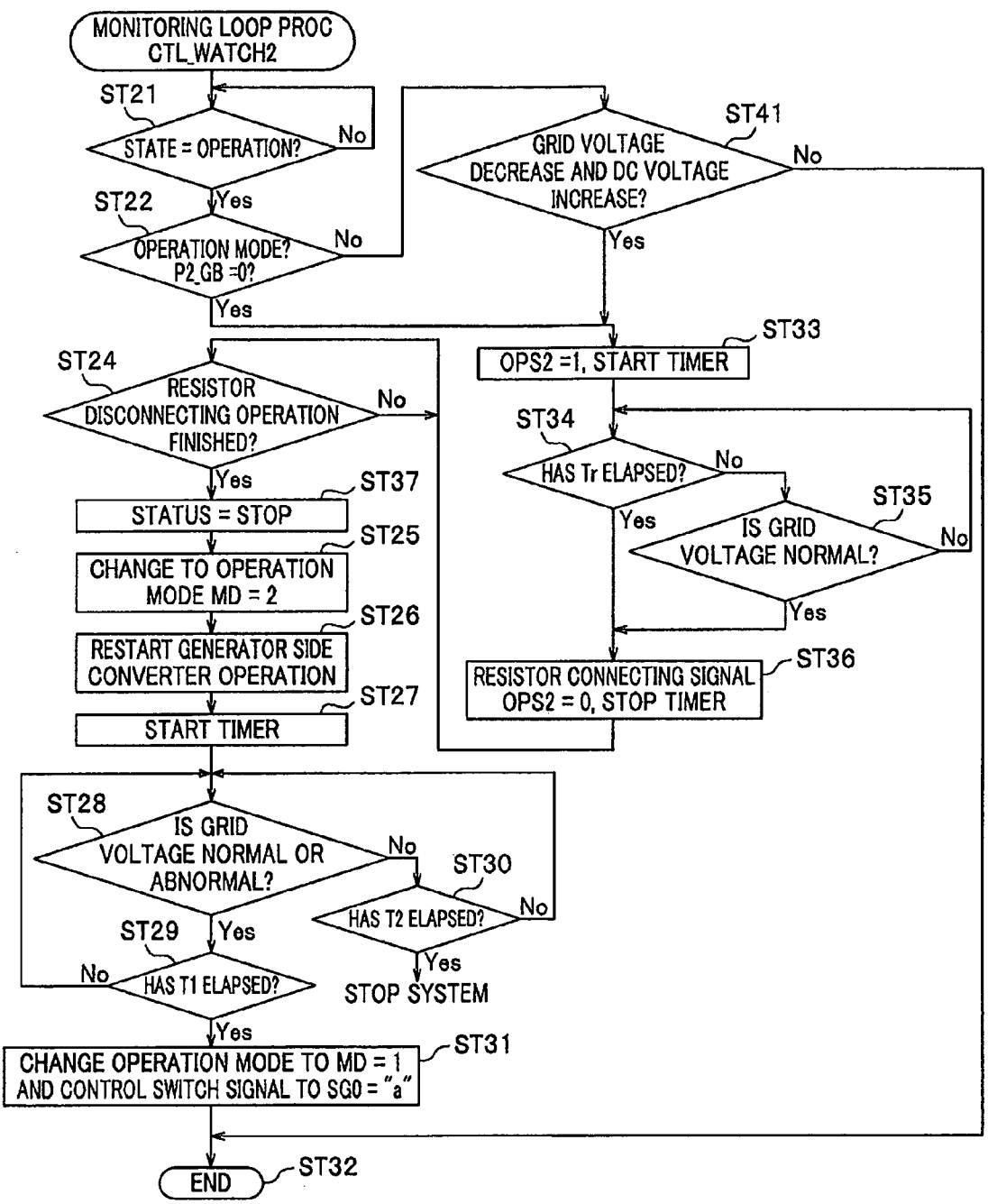
FIG. 20 is a flowchart showing operation of a monitoring loop process for the generator side converter in the converter controller according to a third embodiment.

FIG. 20 shows a flowchart of control operation of the generator side converter 2042, which is different from that show in FIG. 18 in that the excessive current upon a power system failure is monitored in the operation mode. When the excessive current detection signal P2_GB=1, it is determined that there is no excessive current. Further, in the third embodiment, it is further monitored whether the grid voltage decreases and DC voltage increases. When it is detected that the grid voltage decreases and the DC voltage (Cd) increases, a process of connecting the resistors R2 and R3 is performed.

When there is no decrease in the grid voltage and increase in the DC voltage, the monitoring process is finished.

As mentioned above, because the resistors R2 and R3 are connected in response to detection of the decrease in the grid voltage and increase in the DC voltage (Cd), if the excessive current occurs lately (for example, this may occur in the case where a generated power is small and thus the current is small), connecting of the resistors R2 and R3 can be made earlier. This prevents a DC excessive voltage.

Fourth Embodiment

Figure 21:
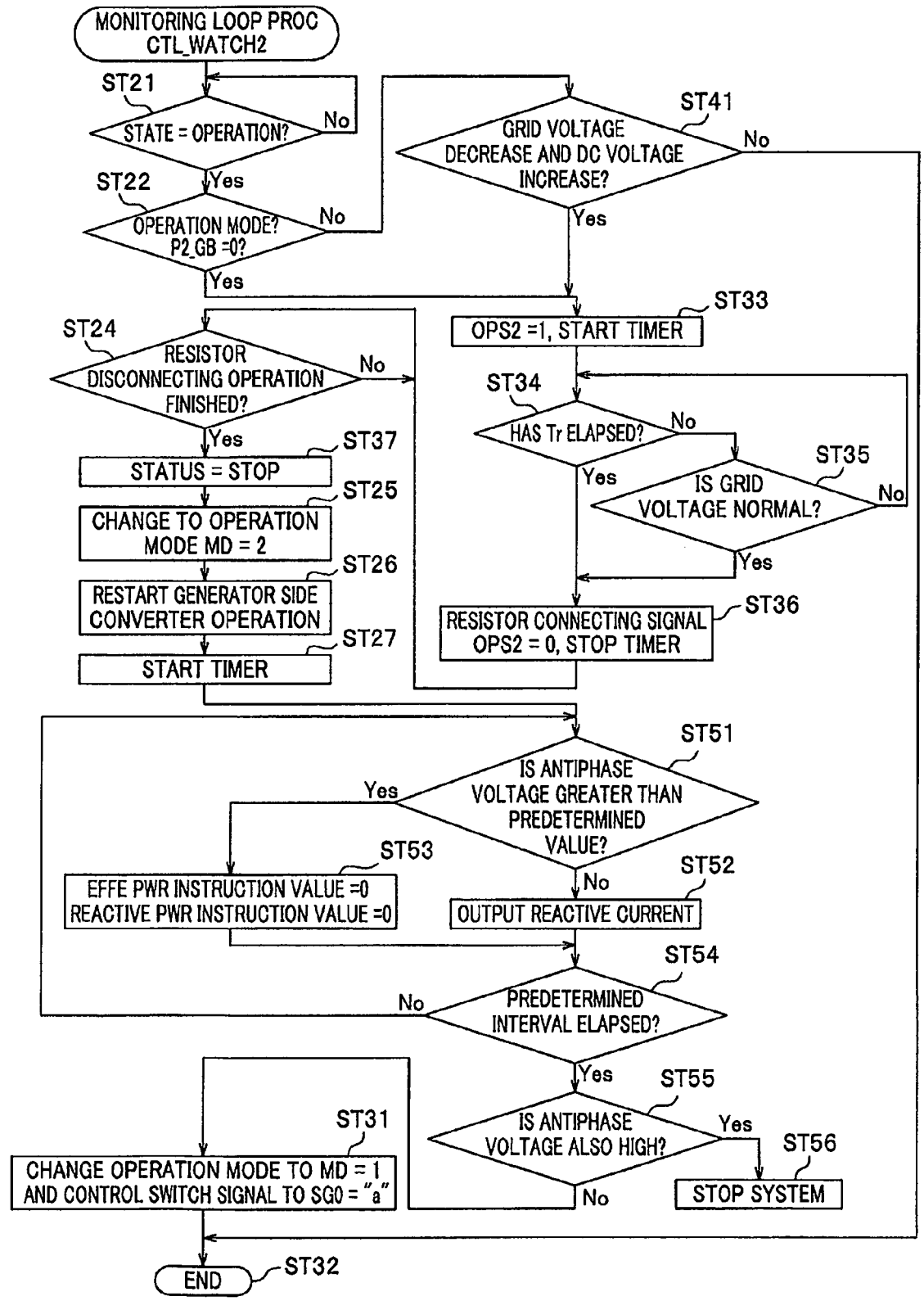
FIG. 21 is a flowchart showing operation of a monitoring loop process for the generator side converter in the converter controller according to a fourth embodiment.

FIG. 21 shows the converter controller 205 according to a fourth embodiment. The converter controller 205 according to the fourth embodiment is different from that shown in FIG. 20 is in a control operation after the operation of the gate side converter 2042 is started.

When either of an excessive rotor current is detected or the DC voltage increase or the decrease in the grid voltage is detected, the operation mode OPS2=1, the generator side converter 2042 moves to a stop status (stop of switching ON and OFF operation of the semiconductor devices). After a predetermined interval elapses, when the disconnection status has been finished, the operation of the generator side converter 2042 is restarted by making the operation mode MD=2 in the step ST25. After the start of operation of the generator side converter 2042 in the steps ST26 and ST27, an antiphase component of the grid voltage is detected (calculated), and when the antiphase voltage is greater than a predetermined value in a step ST51, which is set to a value greater than an antiphase component in the normal status grid (for example, 3%), the active power command and the reactive power command are set to zero in a step ST53. When the antiphase voltage is not greater than a predetermined value, a reactive current is outputted in a step ST52 for a predetermined interval (ST54) as indicated by Grid Code of E. ON where a magnitude of the reactive current (%) twice a voltage drop (%) should be outputted. When the antiphase voltage of the grid is large, there is a tendency that a pulsation voltage caused by the antiphase component may be large at secondary terminals of the AC-excited generator. Accordingly, if control is made to increase a current, the current may become excessive. Thus, when the antiphase voltage is large, it is preferable that the power of the stator is zero. When the antiphase voltage is small, in which case, the pulsation voltage caused by the antiphase voltage on the rotor side is small, the operation can be performed with out an excessive current although a reactive current is outputted from the stator of the generator. After a predetermined interval (for example, an interval determined in accordance with a standard of the power transmission) elapses, when the antiphase voltage is also high in a step ST55, the wind turbine generator system is stopped as a power system failure in a step ST56. If the antiphase voltage is small, the operation moves to a normal generation operation in the step ST31.

As mentioned above, when the antiphase voltage is large, making the generation power and the reactive power zero prevents the rotor current from being excessive due to the antiphase component in the grid.

Fifth Embodiment

Figure 22:
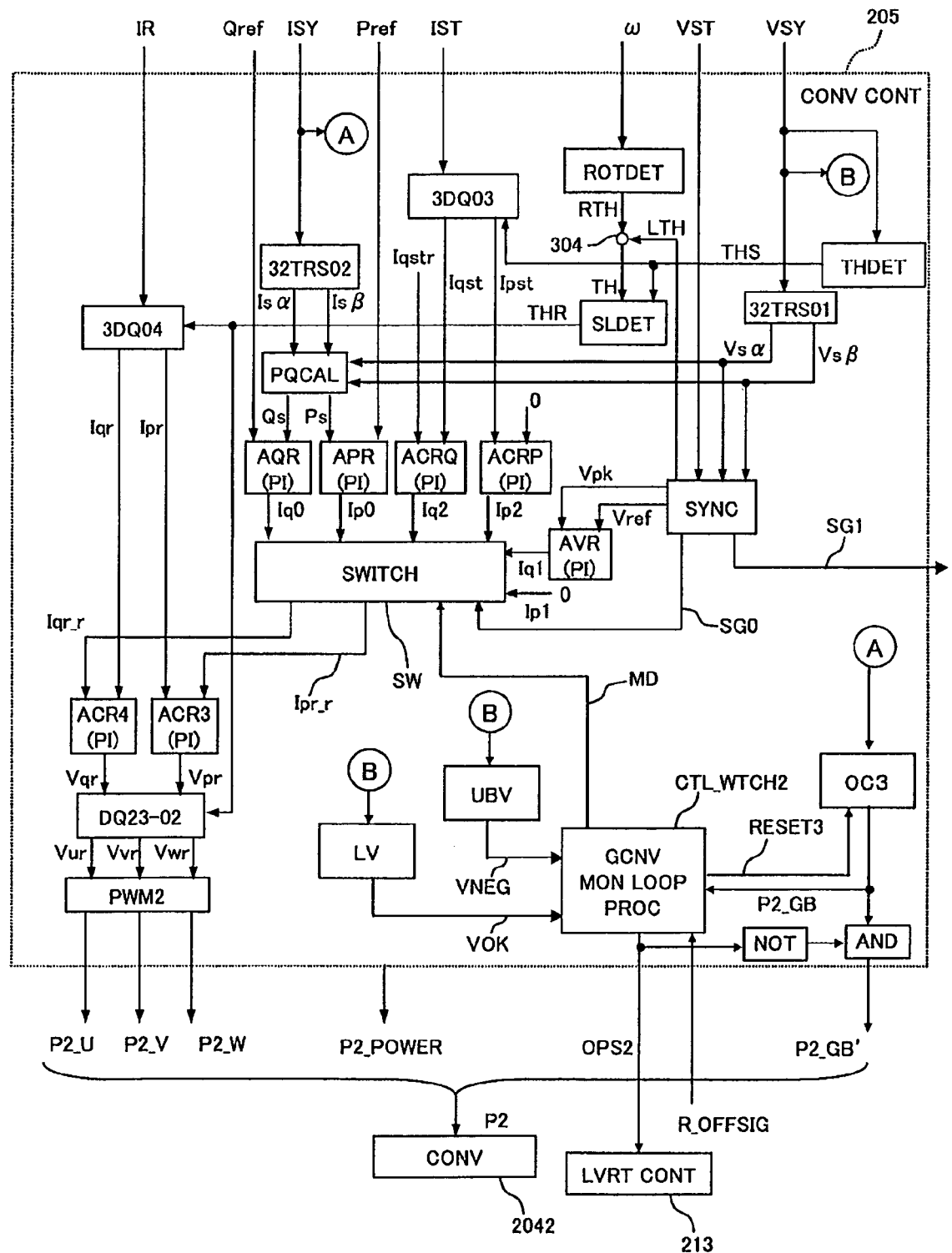
FIG. 22 is a schematic circuit diagram of a grid side converter according to a fifth embodiment, wherein an excessive current detector is responsive to a stator current.
Figure 23:
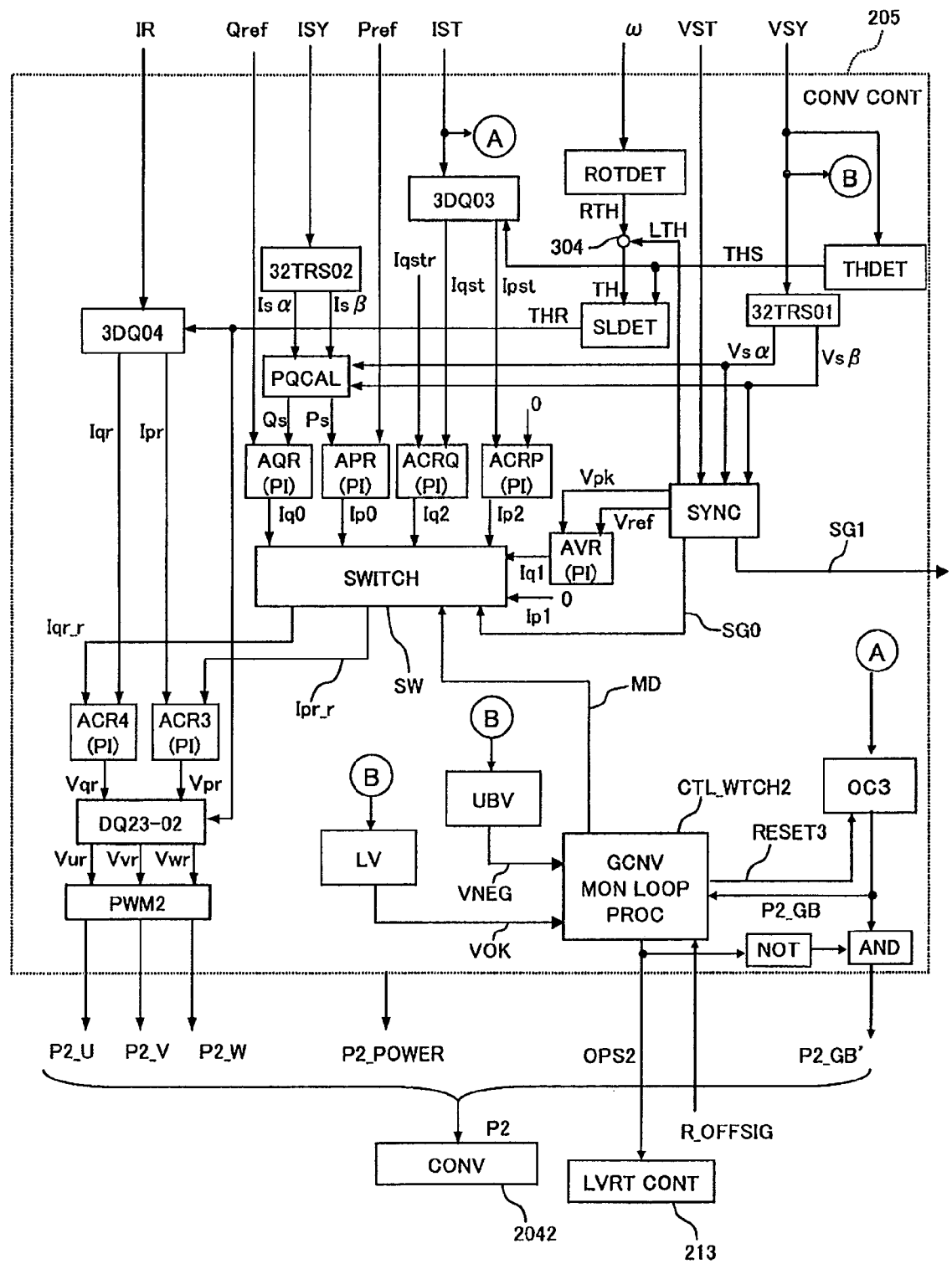
FIG. 23 is a schematic circuit diagram of a grid side converter according to the fifth embodiment, wherein an excessive current detector is responsive to a system current.

FIGS. 22 and 23 show converter controllers 205 according to a fifth embodiment. The converter controllers 205 according to the fifth embodiment is different from that shown in FIG. 7 is in that a stator current IST (FIG. 23) or a system current ISY (FIG. 22) is used as an input of the excessive current detector OC3. As mentioned above, the DC excessive voltage can be prevented by operating the power system failure response unit using a signal other than the rotor current.

The present invention is applicable to a power converter for exciting a doubly-fed generator and generating unit.

Further, the present invention is applicable to an exciting converter and a power generation apparatus for a Doubly-Fed Induction Machine.

As mentioned above, the present invention provides a wind turbine generator system comprising: an AC-excited generator, including a stator to be connected to a grid and a rotor coupled to a turbine for rotating the rotor, configured to supply a power to the grid; a converter unit including: an AC exciting converter, including a first DC part, configured to perform power conversion to AC-excite the rotor; and a grid side converter, connected to the stator and to be connected to the grid, including a second DC part connected to the first DC part, configured to perform power conversion to control a DC voltage; a short-circuiting circuit, including an AC input connected a point between the rotor and the AC exciting converter, a switching device, and a resistor which is disconnected and connected by the switching device, configured to short-circuit; and a controller, supplied with a backup power upon decrease in grid voltage, configured to control the AC-exciting converter and the grid side converter, the controller including a first detector for detecting a grid voltage and a second detector for detecting the DC voltage, the controller operating the short-circuiting circuit when decrease in the grid voltage and increase in the DC voltage are detected.

In this configuration, the controller may further comprise: a current detector that detects an excessive current (greater than a predetermined value) flowing between the generator and the converter unit; and an error detecting circuit that generates an error signal when decrease in the grid voltage is detected and increase in the DC voltage is detected, wherein the controller operates the short-circuiting circuit in response to either of an output of the current detector or the error signal.

Further, in the configuration, the controller may further comprise: a current detector that detects an excessive current (greater than a predetermined value) flowing through the stator; an error detecting circuit that generates an error signal when decrease in the grid voltage is detected and increase in DC voltage is detected, wherein the controller operates the short-circuiting circuit in response to either of an output of the current detector or the error signal.

Further, in the configuration, the controller may further comprise: a current detector that detects an excessive current flowing from the generator to the grid; an error detecting circuit that generates an error signal when decrease in the grid voltage is detected and increase in DC voltage is detected, wherein the controller operates the short-circuiting circuit in response to either of an output of the current detector or the error signal.

Further, in the configuration, the increase in the DC voltage may be detected when a value of the DC voltage is greater than a value of the DC voltage in a normal operation status of the wind turbine generator system.

Further, in the configuration, the increase in the DC voltage may be detected when a deviation of the detected DC voltage from a command of a DC voltage for the converter unit is greater than a predetermined value.

Further, in the configuration, the controller may further comprise: a current detector that detects an excessive current (greater than a predetermined value) flowing between the generator and the converter unit. The AC exciting converter may comprise switching devices comprising gates for gate switching operation. The controller may stop the gate switching operation in response to detection of the excessive current.

Further, in the configuration, the short-circuiting circuit may comprise a plurality of resistors for short-circuiting (consume currents flowing therethrough) and connect a plurality of the resistors substantially simultaneously and disconnects a plurality of the resistors successively.

Further, in the configuration, the short-circuiting circuit may disconnect a plurality of the resistors successively within an interval equal to or shorter than 10 ms.

Further, in the configuration, the short-circuiting circuit may comprise a plurality of resistors for short-circuiting and connect a plurality of the resistors substantially simultaneously for short-circuiting to consume power and disconnect a plurality of the resistors successively. The interval for which a plurality of the resistors may be simultaneously (all) connected varies and be determined on the basis of an amplitude of the grid voltage.

Further, in the configuration, the controller may further comprise: a current detector that detects an excessive current (greater than a predetermined value) flowing between the generator and the converter unit; and the AC exciting converter comprises switching devices comprising gates for gate switching operation. The controller may stop the gate switching operation in response to detection of the excessive current within an interval. The short-circuiting circuit may comprise a plurality of resistors for short-circuiting and connect a plurality of the resistors substantially simultaneously and disconnect a plurality of the resistors successively. The control circuit may restart the switching operation within 10 ms from when a plurality of the resistors are all disconnected.

Further, in the configuration, the controller may further comprise: a current detector that detects an excessive current (greater than a predetermined value) flowing between the generator and the converter unit; and the AC exciting converter comprises switching devices comprising gates for gate switching operation. The controller may stop the gate switching operation in response to detection of the excessive current within an interval, wherein the short-circuiting circuit comprises a plurality of resistors for short-circuiting and connect a plurality of the resistors substantially simultaneously and disconnects a plurality of the resistors successively. The control circuit may restart the switching operation and after the switching operation is restart. The controller may comprise an anti-phase detector for detecting an anti-phase component in the grid voltage. The controller may control the converter unit so as to make an active power and a reactive power from the stator substantially zero.

Further, in the configuration, the short-circuiting circuit may comprise a plurality of resistors for short-circuiting and connect a plurality of the resistors substantially simultaneously and disconnects a plurality of the resistors successively. The controller may allow the short-circuiting circuit to operate a cycle from connecting to disconnecting a plurality of the resistors twice for a predetermined interval and at third times of the cycle, the controller may stop the wind turbine generator system.

Further, in the configuration, the controller may decrease the DC voltage of the DC circuit when the detected grid voltage decreases.

Further, in the configuration, the controller may change a control mode of controlling the converter unit to a discharging an active component current (from charging) when the detected DC voltage increases.

Further, the wind turbine generator system may further comprise a current detector for detecting an excessive AC current (greater than a predetermined value) outputted by the grid side converter. The controller may temporarily stop an operation of the grid side converter and restarts the operation.

The invention claimed is:
1. A wind turbine generator system comprising:
an AC-excited generator, including a stator to be connected to a grid and a rotor coupled to a turbine for rotating the rotor, configured to supply a power to the grid;
a converter unit including:
an AC exciting converter, including a first DC part, configured to perform power conversion to AC-excite the rotor; and
a grid side converter, connected to the stator and to be connected to the grid, including a second DC part connected to the first DC part, configured to perform power conversion to control a DC voltage;
a short-circuiting circuit, including an AC input connected a point between the rotor and the AC exciting converter, a switching device, and a resistor which is disconnected and connected by the switching device, configured to short-circuit; and
a controller, supplied with a backup power upon decrease in grid voltage, configured to control the AC-exciting converter and the grid side converter, the controller including a first detector for detecting a grid voltage and a second detector for detecting the DC voltage, the controller operating the short-circuiting circuit when decrease in the grid voltage and increase in the DC voltage are detected.

2. The wind turbine generator system as claimed in claim 1, wherein the controller further comprising:
a current detector that detects an excessive current flowing between the generator and the converter unit; and
an error detecting circuit that generates an error signal when decrease in the grid voltage is detected and increase in the DC voltage is detected, wherein the controller operates the short-circuiting circuit in response to either of an output of the current detector or the error signal.

3. The wind turbine generator system as claimed in claim 1, wherein the controller further comprising:
a current detector that detects an excessive current flowing through the stator;
an error detecting circuit that generates an error signal when decrease in the grid voltage is detected and increase in DC voltage is detected, wherein the controller operates the short-circuiting circuit in response to either of an output of the current detector or the error signal.

4. The wind turbine generator system as claimed in claim 1, wherein the controller further comprising:
a current detector that detects an excessive current flowing from the generator to the grid;
an error detecting circuit that generates an error signal when decrease in the grid voltage is detected and increase in DC voltage is detected, wherein the controller operates the short-circuiting circuit in response to either of an output of the current detector or the error signal.

5. The wind turbine generator system as claimed in claim 1, wherein the increase in the DC voltage is detected when a value of the DC voltage is greater than a value of the DC voltage in a normal operation status of the wind turbine generator system.

6. The wind turbine generator system as claimed in claim 1, wherein the increase in the DC voltage is detected when a deviation of the detected DC voltage from a command of a DC voltage for the converter unit is greater than a predetermined value.

7. The wind turbine generator system as claimed in claim 1, wherein the controller further comprises: a current detector that detects an excessive current flowing between the generator and the converter unit; and the AC exciting converter comprises switching devices comprising gates for gate switching operation, and wherein the controller stops the gate switching operation in response to detection of the excessive current.

8. The wind turbine generator system as claimed in claim 1, wherein the short-circuiting circuit comprises a plurality of resistors for short-circuiting and connects a plurality of the resistors substantially simultaneously and disconnects a plurality of the resistors successively.

9. The wind turbine generator system as claimed in claim 1, wherein the short-circuiting circuit disconnects a plurality of the resistors successively within an interval equal to or shorter than 10 ms.

10. The wind turbine generator system as claimed in claim 1, wherein the short-circuiting circuit comprises a plurality of resistors for short-circuiting and connects a plurality of the resistors substantially simultaneously and disconnects a plurality of the resistors successively, and wherein an interval for which a plurality of the resistors are simultaneously connected varies and is determined on the basis of an amplitude of the grid voltage.

11. The wind turbine generator system as claimed in claim 1, wherein the controller further comprising: a current detector that detects an excessive current flowing between the generator and the converter unit; and the AC exciting converter comprises switching devices comprising gates for gate switching operation,
wherein the controller stops the gate switching operation in response to detection of the excessive current within an interval,
wherein the short-circuiting circuit comprises a plurality of resistors for short-circuiting and connects a plurality of the resistors substantially simultaneously and disconnects a plurality of the resistors successively, and
wherein the control circuit restarts the switching operation within 10 ms from when a plurality of the resistors are all disconnected.

12. The wind turbine generator system as claimed in claim 1, wherein the controller further comprises: a current detector that detects an excessive current flowing between the generator and the converter unit; and the AC exciting converter comprises switching devices comprising gates for gate switching operation,
wherein the controller stops the gate switching operation in response to detection of the excessive current within an interval,
wherein the short-circuiting circuit comprises a plurality of resistors for short-circuiting and connects a plurality of the resistors substantially simultaneously and disconnects a plurality of the resistors successively,
wherein the control circuit restarts the switching operation and after the switching operation is restart, and
wherein the controller comprises an anti-phase detector for detecting an anti-phase component in the grid voltage, and
wherein the controller controls the converter unit so as to make an active power and a reactive power from the stator substantially zero.

13. The wind turbine generator system as claimed in claim 1, wherein the short-circuiting circuit comprises a plurality of resistors for short-circuiting and connects a plurality of the resistors substantially simultaneously and disconnects a plurality of the resistors successively, wherein the controller allows the short-circuiting circuit to operate a cycle from connecting to disconnecting a plurality of the resistors twice for a predetermined interval and at third times of the cycle, the controller stops the wind turbine generator system.

14. The wind turbine generator system as claimed in claim 1, wherein the controller decreases the DC voltage of the DC circuit when the detected grid voltage decreases.

15. The wind turbine generator system as claimed in claim 1, wherein the controller changes a control mode of controlling the converter unit to a discharging an active component current when the detected DC voltage increases.

16. The wind turbine generator system as claimed in claim 1, further comprising a current detector for detecting an excessive AC current outputted by the grid side converter, wherein the controller temporarily stops an operation of the grid side converter and restarts the operation.

\* \* \* \* \*